(12) United States Patent
Shimotaya et al.

(10) Patent No.: US 8,161,221 B2
(45) Date of Patent: Apr. 17, 2012

(54) STORAGE SYSTEM PROVIDED WITH FUNCTION FOR DETECTING WRITE COMPLETION

(75) Inventors: Suguru Shimotaya, Chigasaki (JP); Susumu Tsuruta, Odawara (JP); Daisuke Isobe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 608 days.

(21) Appl. No.: 12/308,574

(22) PCT Filed: Nov. 25, 2008

(86) PCT No.: PCT/JP2008/003467
§ 371 (c)(1),
(2), (4) Date: Dec. 18, 2008

(87) PCT Pub. No.: WO2010/061420
PCT Pub. Date: Jun. 3, 2010

(65) Prior Publication Data
US 2011/0153884 A1 Jun. 23, 2011

(51) Int. Cl.
*G06F 13/20* (2006.01)
(52) U.S. Cl. .......... 710/313; 710/305; 711/154
(58) Field of Classification Search .......... 710/313–314, 710/305–306; 711/154
See application file for complete search history.

(56) References Cited

U.S. PATENT DOCUMENTS

| 7,562,264 | B2 * | 7/2009 | Tangvald et al. | 714/49 |
| 7,590,817 | B2 * | 9/2009 | Moertl et al. | 711/202 |
| 2005/0044283 | A1 | 2/2005 | Muro | |
| 2005/0256998 | A1 | 11/2005 | Arataki | |
| 2008/0294799 | A1 * | 11/2008 | Ward | 710/1 |
| 2008/0307161 | A1 * | 12/2008 | Wei | 711/114 |

FOREIGN PATENT DOCUMENTS

| EP | 1936487 A2 | 8/2007 |
| JP | 2001-243206 | 2/2000 |

* cited by examiner

*Primary Examiner* — Brian Misiura
*Assistant Examiner* — Kim Huynh
(74) *Attorney, Agent, or Firm* — Stites & Harbison, PLLC

(57) ABSTRACT

It is an object to prevent a processing speed of the storage system provided with a function for detecting a write completion of data from being reduced.

A controller module is provided with at least one processor module, at least one storage resource, and at least one transfer control module connected to the processor module and the storage resource. The transfer control module is provided with a receiver and a transmitter. The receiver receives a write packet from the processor module, includes a specific code in the write packet, and then transmits the write packet. In the case in which the transmitter receives a write packet and the received write packet includes the specific code, the transmitter writes targeted data in the write packet to the storage resource to be written, generates a response packet that is a response indicating a completion of a write, and transmits the generated response packet.

14 Claims, 18 Drawing Sheets

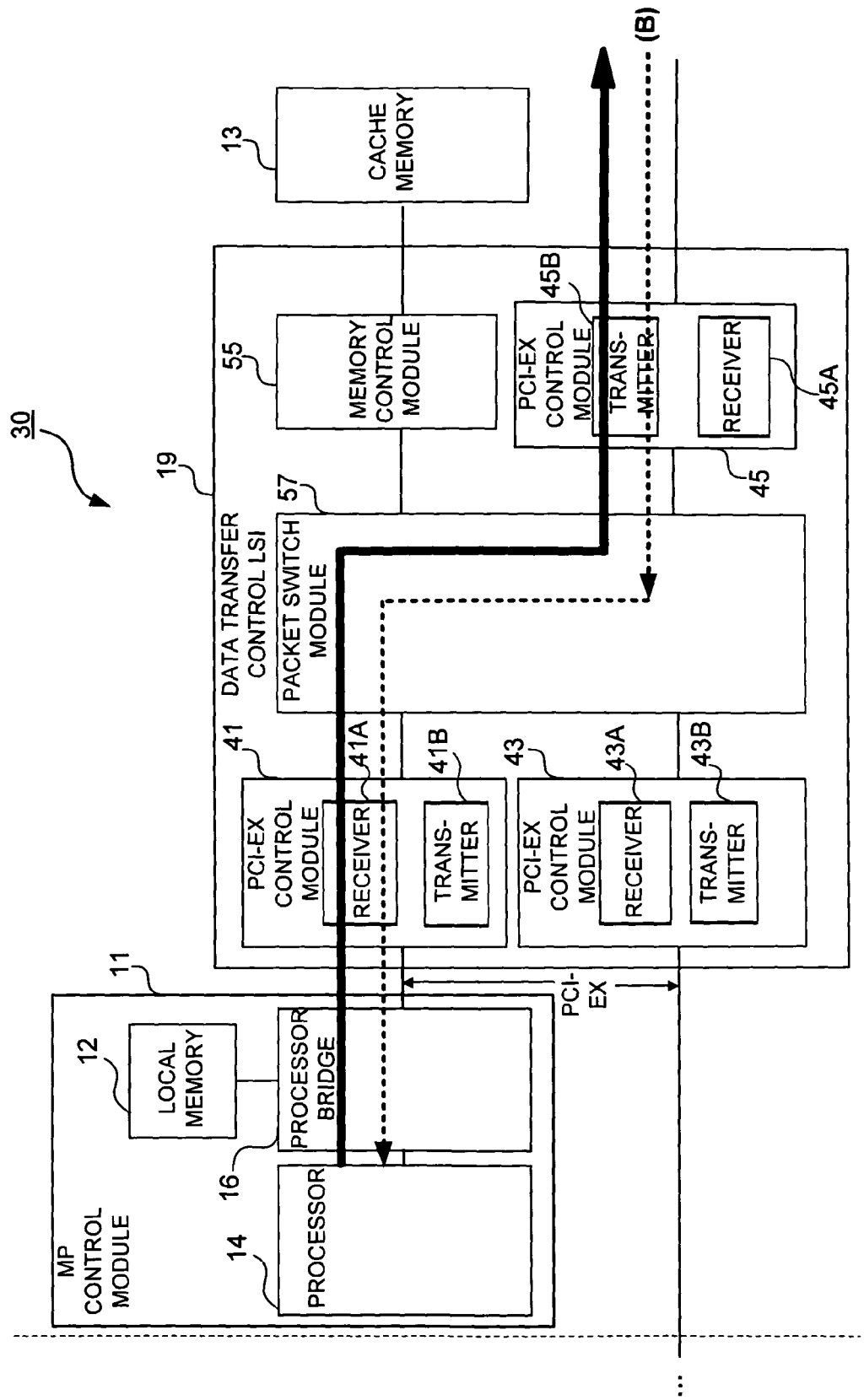

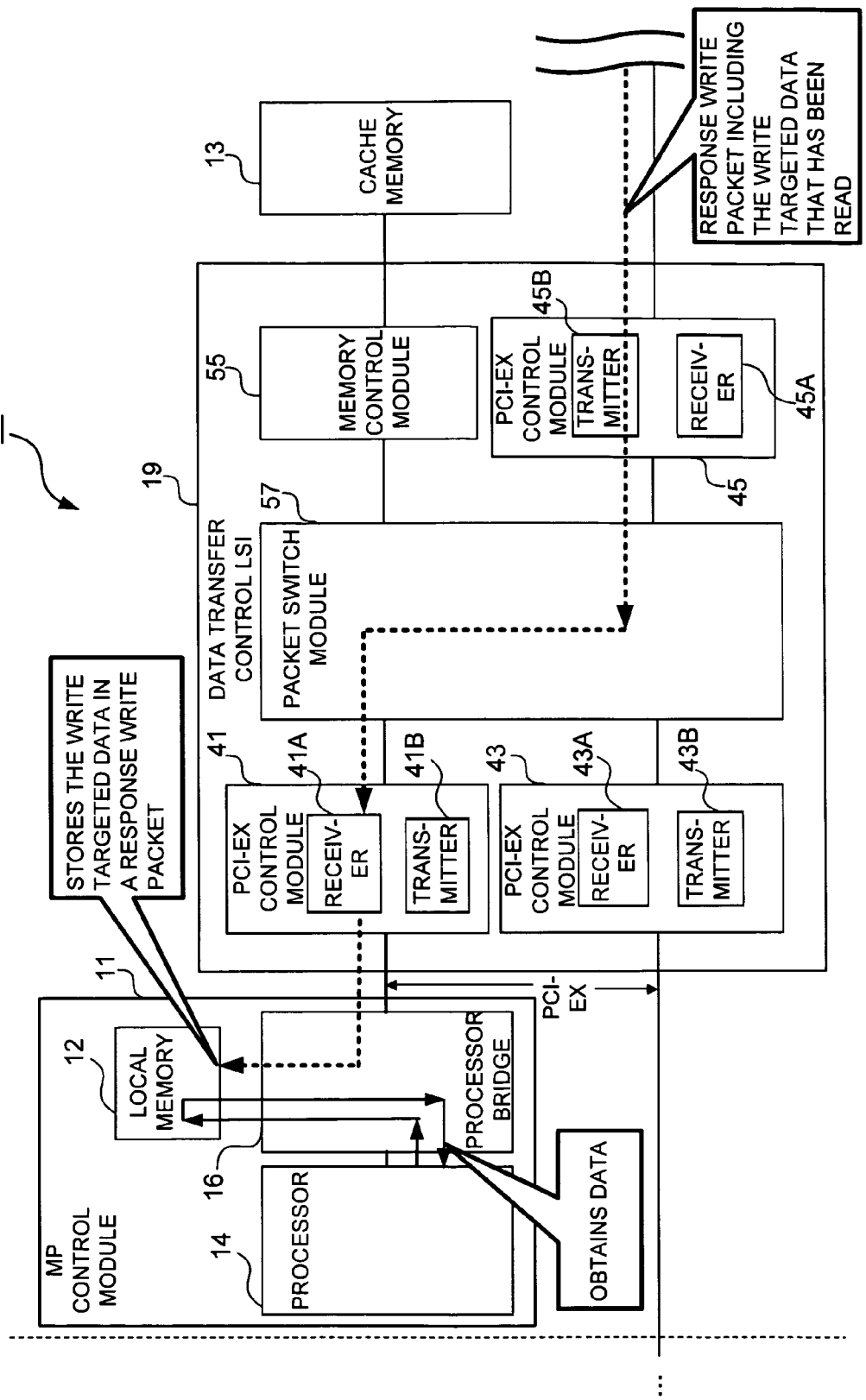

STORAGE SYSTEM PROVIDED WITH FUNCTION FOR DETECTING WRITE COMPLETION

TECHNICAL FIELD

The present invention generally relates to a control of a storage system provided with a function for detecting a completion of a write of data.

BACKGROUND ART

A memory control device disclosed in Patent Citation 1 is known for instance. This memory control device is composed of a processing module, a bridge module, and a memory module. The processing module is provided with a verification command generating control module, and the bridge module is provided with a verification command response module. The verification command generating control module issues a write command for the memory module to normally terminate the transfer, and then issues a verification command for verifying a transfer state of the write command. The verification command response module responds using a reply packet that has been received corresponding to the transfer of the write command as a read date when the bridge module receives the verification command.
[Patent Citation 1]
Japanese Patent Application Laid-Open Publication No. 2001-243206

DISCLOSURE OF INVENTION

Technical Problem

A storage system composed of a controller module and a plurality of storage devices is also known. The controller module is composed of a processor module, a cache memory, and a transfer control module connected to the processor module and the cache memory for instance. The processor module writes the write targeted data to the cache memory, and then writes the write targeted data from the cache memory to a storage device for instance.

As a method for detecting that a write of the write targeted data to the cache memory has been completed, a technique disclosed in Patent Citation 1 can be utilized for instance. More specifically, the processor module transmits a write packet that contains the write targeted data and that is directed to the cache memory, and then transmits a read packet that is directed to the cache memory. The processor module then obtains the write targeted data from the cache memory as a response of the read packet, thereby detecting that the write targeted data has been written to the cache memory.

However, a processing speed of the storage system may be reduced in the case in which the above method is adopted. This is because the processor module transmits a read packet and then waits a response of the read packet, and other processing is not carried out in the meantime.

It is thought that the reduction of a processing speed of the storage system becomes a further problem in the case in which the controller module is composed of at least three controllers connected in series. This is because the processor module included in a controller of one end of at least three controllers connected in series may issue a read packet that is directed to the cache memory included in a controller of the other end of the at least three controllers for instance. In this case, a time elapsing from transmitting the read packet to receiving a response of the read packet may be very long.

An object of the present invention is to prevent a processing speed of the storage system provided with a function for detecting a write completion of data from being reduced.

Technical Solution

A controller module is provided with at least one processor module, at least one storage resource, and at least one transfer control module connected to the processor module and the storage resource. The transfer control module is provided with a receiver and a transmitter. The receiver receives a write packet from the processor module, includes a specific code in the write packet, and then transmits the write packet. In the case in which the transmitter receives a write packet and the received write packet includes the specific code, the transmitter writes the write targeted data in the write packet to the storage resource to be written, generates a response packet that is a response indicating a completion of a write, and transmits the generated response packet.

BRIEF DESCRIPTION OF DRAWINGS

FIG. 4A is a view showing a storage control device at a transmitting source of a write packet for a flow from issuing a write packet to detecting a write completion.

FIG. 17 is a view showing a storage control device in which a fourth write completion report processing is carried out.

EXPLANATION OF REFERENCE

20: Storage system

BEST MODE FOR CARRYING OUT THE INVENTION

A mode for the present invention will be described below in detail with reference to the drawings.

Figure 1:
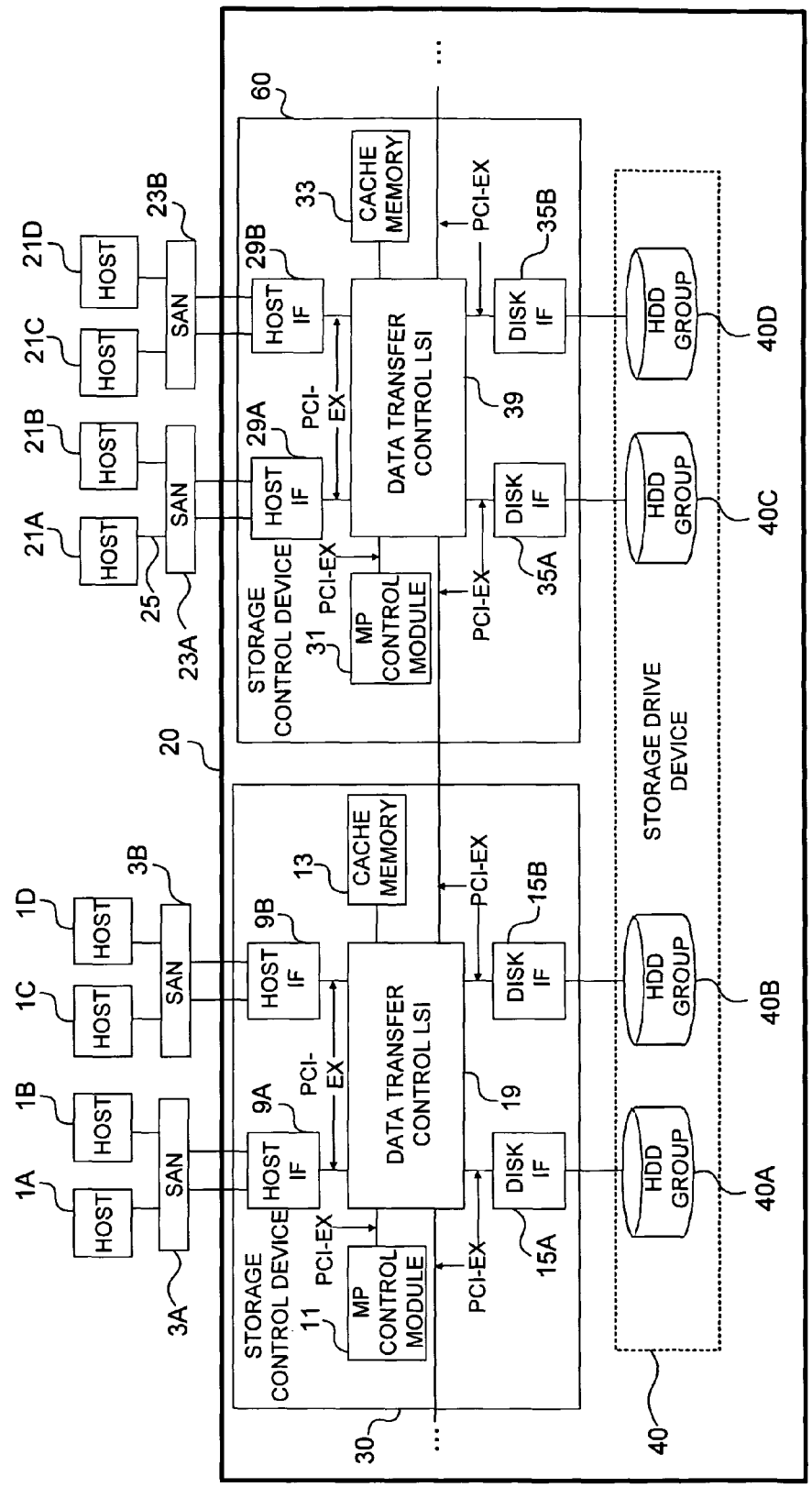
FIG. 1 is a view showing a configuration example of a computer system in accordance with a mode of the present invention.

FIG. 1 is a view showing a configuration example of a computer system in accordance with a mode of the present invention.

A plurality of hosts 1A, 1B, 1C, 1D, 21A, 21B, 21C, and 21D are connected to a storage system 20 via SAN (storage area networks) 3A, 3B, 23A, and 23B. The number of hosts to be connected is not restricted to eight illustrated in the figure, and can be more than eight or less than eight. Moreover, in place of the SAN, other kinds of communication networks such as an LAN (local area network) can be adopted.

To explain the host 1A as an example, for instance, the host 1A is a computer provided with information processing resources such as a CPU (central processing unit) and a memory, and is a personal computer, a workstation, a mainframe or the like. The host 1A is connected to a storage control device 30 via the SAN 3A in such a manner that the host 1A can communicate with the storage control device 30.

The storage system 20 is provided with a storage drive device 40 and a plurality of storage control devices 30, 60, . . . .

The storage drive device 40 is provided with a plurality of HDD groups 40A, 40B, 40C, and 40D for instance. To explain the HDD group 40A as an example, the HDD group 40A is a RAID (redundant array of independent (or inexpensive) disks) group. Data is stored in the HDD group 40A according to a predetermined RAID level. One or a plurality of logical volumes is created based on the HDD group 40A. The number of HDD groups is not restricted to four illustrated in the figure, and can be more than four or less than four. Moreover, for the storage drive device 40, the HDD can be replaced by other kinds of storage devices such as a semiconductor memory like a flash memory.

Figure 3:
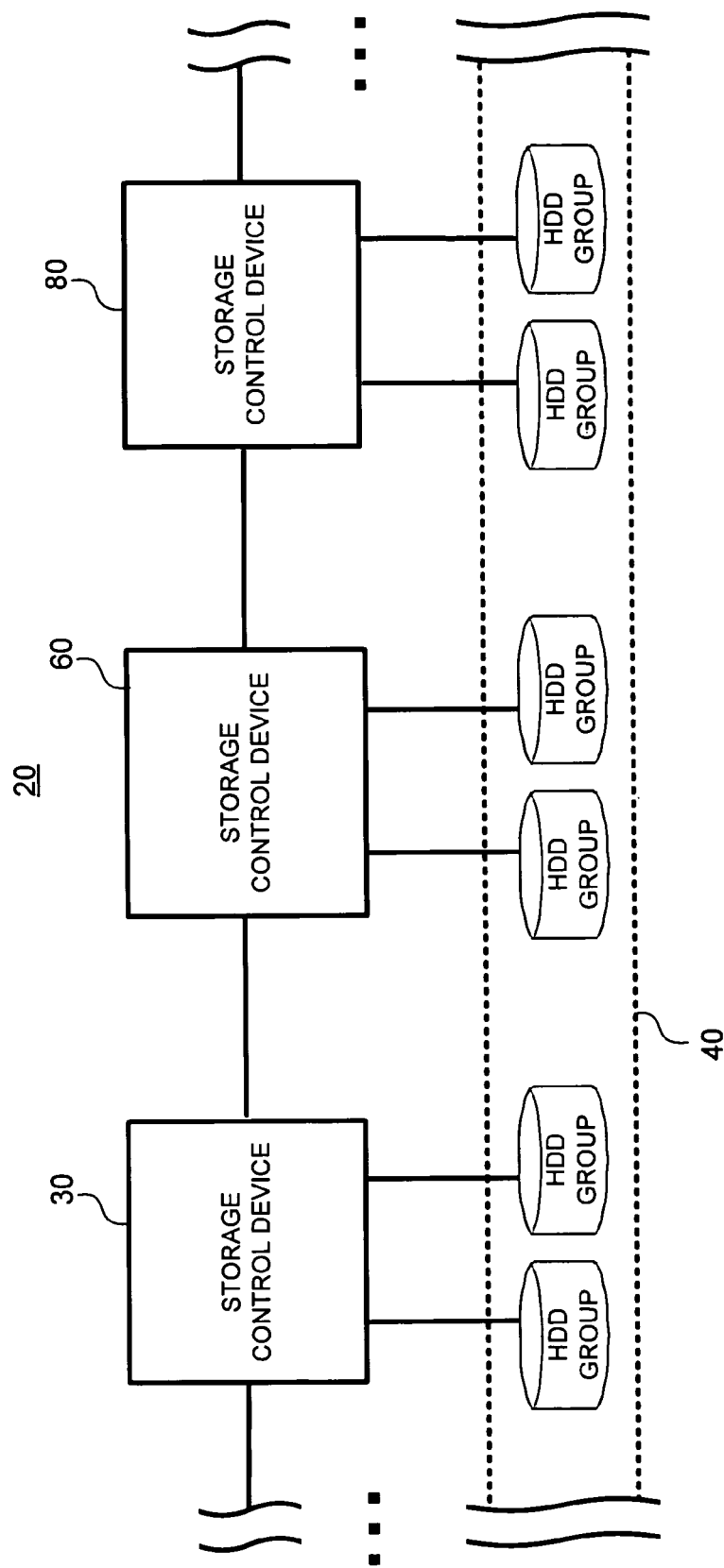
FIG. 3 is a view showing at least three storage control devices connected in series in a storage system.

The number of storage control devices is not restricted to two illustrated in FIG. 1. As shown in FIG. 3 for instance, at least three storage control devices 30, 60, and 80 can be connected in series for the storage system 20. However, in the following description, two storage control devices 30 and 60 connected to each other are explained as an example for simplifying the explanation.

The storage control device 30 (60) receives an I/O (input/output) command (a write command or a read command) from any of hosts 1A to 1D (21A to 21D) and carries out an I/O processing to the HDD group 40A or 40B (40C or 40D) according to the received I/O command.

The storage control device 30 (60) is provided with host IF (interfaces) 9A and 9B (29A and 29B), an MP (micro processor) control module 11 (31), a cache memory 13 (33), disk IF 15A and 15B (35A and 35B), and a data transfer control LSI (large scale integration) 19 (39).

The host IF 9A and 9B (29A and 29B) are explained using the host IF 9A as an example. The host IF 9A is an LSI for controlling a protocol processing in a communication with the host 1A, thereby being a so-called protocol chip. The host IF 9A receives an I/O command from the host 1A or 1B, and then transmits data to the host 1A or 1B or receives data from the host 1A or 1B.

The MP control module 11 (31) responds to the I/O command received by the host IF 9A or 9B, and carries out an I/O processing. In the I/O processing (or other processing), the MP control module 11 (31) issues a write packet that is directed to the storage resource (a local memory or a cache memory) included in another storage control device in the storage system 20.

The cache memory 13 (33) is a volatile (or nonvolatile) memory for instance, and temporarily stores data that is transmitted or received between the hosts 1A to 1D (21A to 21D) and the HDD groups 40A to 40D.

The disk IF 15A and 15B (35A and 35B) are explained using the disk IF 15A as an example. The disk IF 15A is an LSI that controls a protocol processing in a communication of a HDD, and is a so-called protocol chip. The disk IF 15A reads data from the HDD group 40A, and writes data stored in the cache memory 13 to the HDD group 40A.

The data transfer control LSI 19 (39) controls a communication among the host IF 9A and 9B (29A and 29B), the disk IF 15A and 15B (35A and 35B), the MP control module 11, the cache memory 13, and a data transfer control LSI in another storage control device.

A communication that conforms to the PCI-Express standard (hereafter referred to as PCI-EX) is carried out between the host IF 9A and 9B (29A and 29B) and the data transfer control LSI 19 (39), between the MP control module 11 (31) and the data transfer control LSI 19 (39), between the disk IF 15A and 15B (35A and 35B) and the data transfer control LSI 19 (39), and between the data transfer control LSIs.

The configuration of the data transfer control LSI will be explained using the data transfer control LSI 19 as an example in the following.

Figure 2:
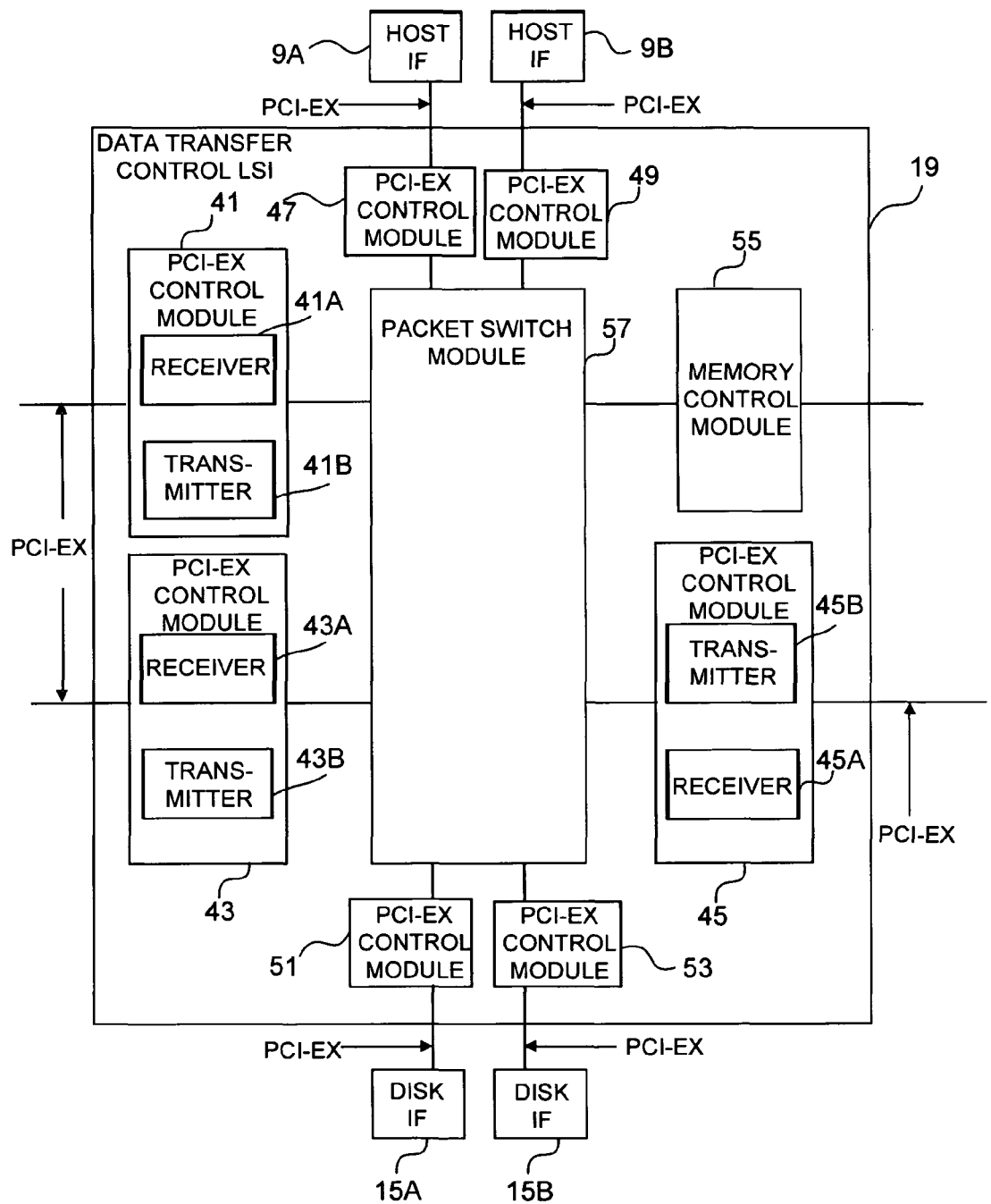
FIG. 2 is a functional block diagram showing an internal configuration of a data transfer control LSI.

FIG. 2 is a functional block diagram showing an internal configuration of the data transfer control LSI 19.

The data transfer control LSI 19 is provided with PCI-EX control modules represented by references 41, 43, 45, 47, 49, 51, and 53 (hereafter referred to as references 41 to 53), a memory control module 55, and a packet switch module 57. The PCI-EX control module 41 is connected to the MP control module 11, the PCI-EX control module 43 is connected to a data transfer control LSI in another storage control device, the PCI-EX control module 45 is connected to the data transfer control LSI 39 in another storage control device 60, the PCI-EX control modules 47 and 49 are connected to the host IF 9A and 9B, and the PCI-EX control modules 51 and 53 are connected to the disk IF 15A and 15B. In this mode of the present invention, the configurations of the PCI-EX control modules represented by references 41 to 53 are equivalent to each other. Consequently, the PCI-EX control module 41 will be explained as an example, and other PCI-EX control modules (references 43 to 53) will be explained as needed.

The PCI-EX control module 41 is connected to the MP control module 11, and is an interface circuit provided with a function for controlling a communication with the MP control module 11. The PCI-EX control module 41 is provided with a receiver 41A and a transmitter 41B. For reference's sake, a receiver 43A and a transmitter 43B in the PCI-EX control module 43 and a receiver 45A and a transmitter 45B in the PCI-EX control module 45 are also shown in FIG. 2. In the following, the receivers 41A, 43A, and 45A are explained using the receiver 41A as an example, and the transmitters 41B, 43B, and 45B are explained using the transmitter 41B as an example.

The receiver 41A is a circuit for receiving a packet from the outside (here, the MP control module 11), and the transmitter 41B is a circuit for transmitting a packet to the outside (here, the MP control module 11).

Figure 13A:
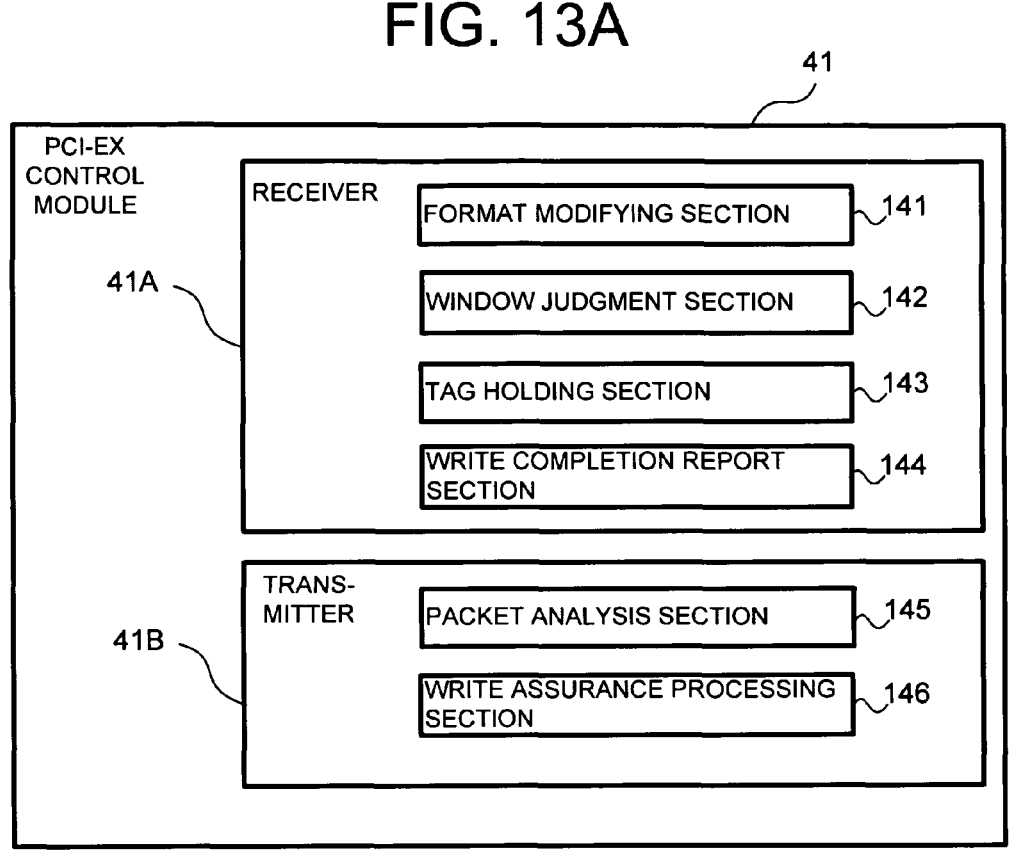
FIG. 13A is a functional block diagram showing a receiver and a transmitter in a PCI-EX control module.

The receiver 41A is provided with the functions (A-1) to (A-4) described below as shown in FIG. 13A:
(A-1) Format modifying section 141
(A-2) Window judgment section 142
(A-3) Tag holding section 143
(A-4) Write completion report section 144
On the other hand, the transmitter 41B is provided with the functions (B-1) and (B-2) described below as shown in FIG. 13A:
(B-1) Packet analysis section 145
(B-2) Write assurance processing section 146
The above functions will be described later.

Figure 13B:
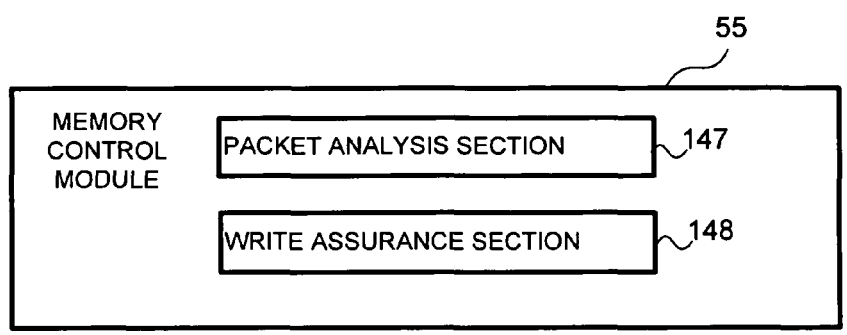
FIG. 13B is a functional block diagram showing a memory control module.

The memory control module 55 is connected to the packet switch module 57 in such a manner that the memory control module 55 can communicate with the packet switch module 57, and receives a packet transmitted from the packet switch module 57. The memory control module 55 is connected to the cache memory 13, and controls a data input/output to the cache memory 13. The memory control module 55 is provided with the functions (C-1) and (C-2) described below as shown in FIG. 13B:
(C-1) Packet analysis section 147
(C-2) Write assurance processing section 148
The functions (C-1) and (C-2) are equivalent to the functions (B-1) and (B-2) described above.

The packet switch module 57 is connected to the PCI-EX control modules represented by references 41 to 53 and to the memory control module 55 in such a manner that the packet switch module 57 can communicate with the PCI-EX control modules and the memory control module. The packet switch module 57 receives a packet that has been output from the PCI-EX control modules or the memory control module, and outputs the packet to any of the PCI-EX control modules represented by references 41 to 53 and the memory control module 55 based on the destination information contained in the packet.

The storage system 20 in accordance with this mode of the present invention is provided with a function for detecting that a write of the write targeted data in a write packet issued by the MP control module has been completed. In this mode of the present invention, by an ingenuity described later, a write completion can be detected without issuing a read packet to which a write destination is specified after the MP control module issues a write packet (without so-called reading again).

Figure 4B:
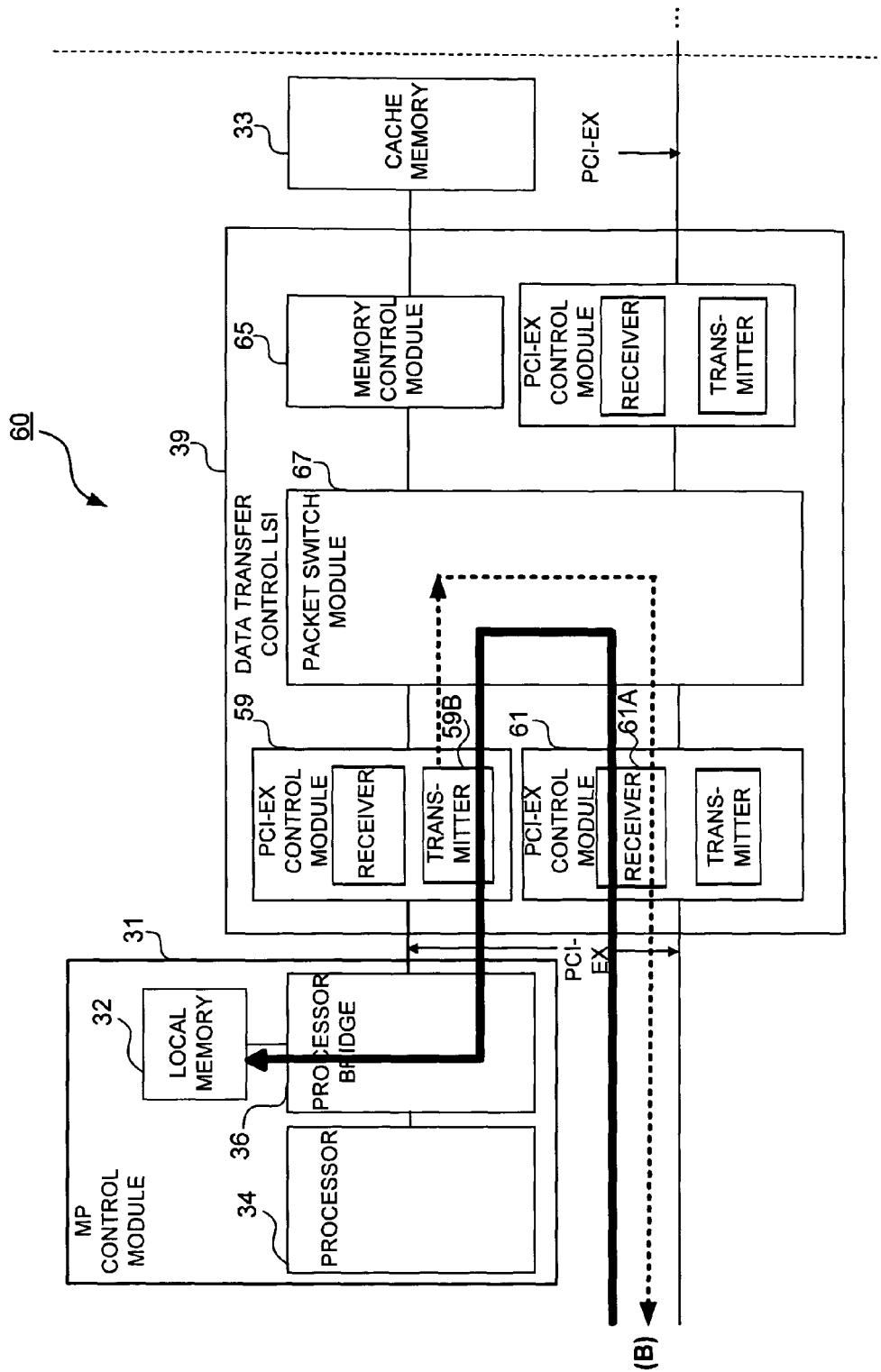
FIG. 4B is a view showing a storage control device at a transmitting source of a write packet for a flow from issuing a write packet to detecting a write completion.

The configuration of the MP control module 11 (31) will be described below with reference to FIGS. 4A and 4B. After that, a flow from issuing a write packet to detecting a write completion will be described. In FIGS. 4A and 4B, a flow of a write is indicated by a bold continuous line, and a flow of a response is indicated by a short dashed line (this is also applied to subsequent FIGS. 6 to 11 and 14).

<Configuration of the MP Control Module 11 (31)>

As shown in FIG. 4A (4B), the MP control module 11 (31) is provided with a local memory 12 (32), a processor 14 (34), and a processor bridge 16 (36). The local memory 12 (32) is a volatile (or nonvolatile) memory for instance, and stores information that is input/output by the processor 14 (34). The processor 14 (34) is a microprocessor, and carries out a computer program stored in the local memory 12 (32). The processor bridge 16 (36) is a switch circuit that is connected to the local memory 12 (32) and the processor 14 (34), and transmits a packet that conforms to the PCI-EX to the PCI-EX control module 41 (59) or receives a packet that conforms to the PCI-EX from the PCI-EX control module 41 (59).

<Flow from Issuing a Write Packet to Detecting a Write Completion>

As shown in FIG. 4A, the processor 14 in the MP control module 11 transmits a write packet.

A destination of the transmitted write packet is the local memory 32 in the MP control module 31 as shown in FIG. 4B. As a case in which the local memory 32 in the storage control device 60 different from the storage control device 30 provided with the processor 14 that issues the write packet is a destination of the write packet as described above, a case provided with the following (4A-1) and (4A-2) can be mentioned for instance.
(4A-1) The host IF 9A or 9B receives an I/O command (such as a read command) from any of the hosts 1A to 1D.
(4A-2) By a method in which the processor 14 refers to configuration information stored in the cache memory 13 (or a storage resource of another kind) (for instance, information indicating that which of logical volumes is configured based on which of HDD groups, and that which of HDD groups is connected to which of storage control devices), it can be found that the HDD group that is a basis of a logical volume specified by the received I/O command is not connected to the storage control device 30 but connected to the storage control device 60.

There are the following three kinds of packets as a packet that is supported by the PCI-EX:
(1) Posted packet, which is a response-unnecessary type packet
(2) Non-Posted packet, which is a response-necessary type packet
(3) Completion packet, which is a packet as a response
In this mode of the present invention, a write packet is a posted packet. A packet that is issued as a response to a write packet is a posted packet, more specifically a write packet. Consequently, the packet as a response is hereafter referred to as a response write packet.

The receiver 41A receives a write packet from the processor 14 via the processor bridge 16. In the case in which the receiver 41A receives a write packet from the MP control module 11 (the processor 14), the Window judgment section 142 in the receiver 41A carries out a Window judgment processing, the tag holding section 143 carries out a tag imparting processing, and the format modifying section 141 carries out a format modifying processing (see FIG. 13A).

Figure 5A:
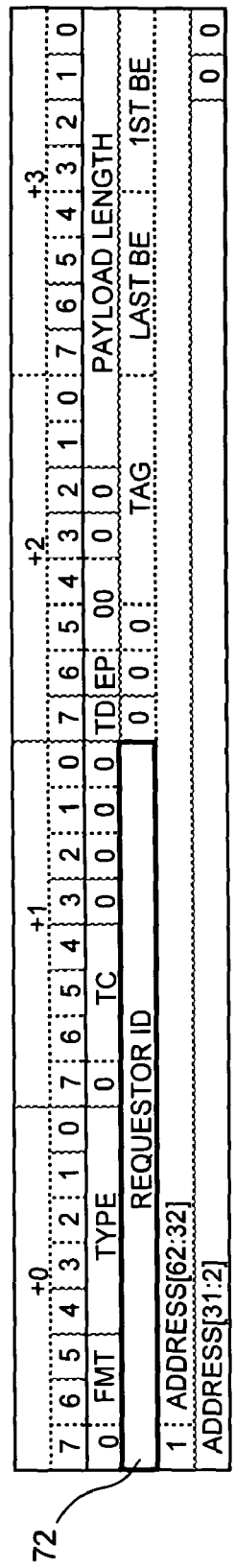
FIG. 5A is a view showing a header section of a pre-modification write packet.

The Window judgment processing, the tag imparting processing, and the format modifying processing are described below with reference to FIGS. 5A and 5B. The write packet before the format modifying processing is hereafter referred to as a pre-modification write packet. The write packet after the format modifying processing is hereafter referred to as a post-modification write packet.

The receiver 41A receives a write packet of the PCI-EX standard format (that is, a pre-modification write packet). The pre-modification write packet can be classified broadly into a header section and a data section for instance. The data section contains the write targeted data. As shown in FIG. 5A, the header section includes a variety of information elements. For instance, "Type" is an information element including a code that indicates a command type (for instance, a write code representing a write). "Tag" is an ID of the write packet. "Requestor ID" is an ID of the source that issues the write packet (for instance, an ID of the processor 14). "Address" is an information element including an address that indicates a write destination of the write targeted data contained in the write packet (for instance, the local memory 32 in the illustrations of FIGS. 4A and 4B).

Figure 12:
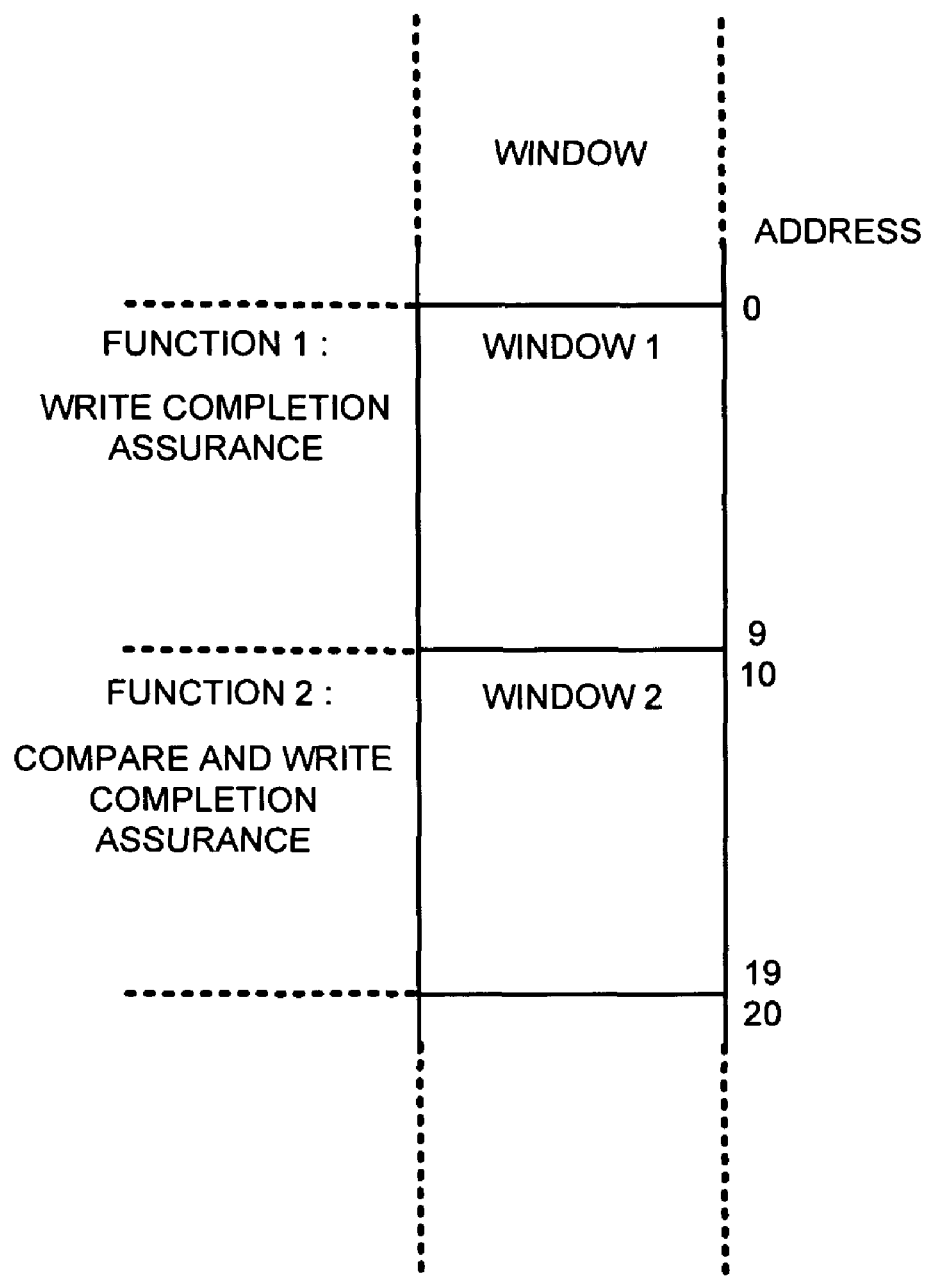
FIG. 12 is a view showing a relationship between Window and a write assurance processing.

"Address" contains an address corresponding to a specification of which of a write completion assurance processing and a compare assurance processing is carried out as a write assurance processing (hereafter referred to as an assurance specification address). The assurance specification address is an address selected from an address range called Window. More specifically, as shown in FIG. 12 for instance, there are Window 1 (address range) 0 to 9 corresponding to the write completion assurance processing and Window 2 (address range) 10 to 19 corresponding to the compare assurance processing. The assurance specification address can be arbitrarily selected by the processor 14. For instance, the processor 14 sets an address that resides in Window 1 to a pre-modification write packet as an assurance specification address in the case in which a high processing speed takes priority over a high reliability. On the other hand, in the case in which a high reliability takes priority over a high processing speed (for instance, in the case in which the write targeted data is important data), the processor 14 sets an address that resides in Window 2 to a pre-modification write packet as an assurance specification address.

The Window judgment processing in accordance with this mode of the present invention is a processing in which the Window judgment section 142 judges that an assurance specification address in a write packet of the PCI-EX standard format resides in which of Window 1 and Window 2.

The tag imparting processing in accordance with this mode of the present invention is a processing in which the tag holding section 143 imparts "Tag" included in a post-modification write packet and holds the "Tag". The tag holding section 143 is provided with a storage resource (hereafter referred to as a storage resource for a tag) and holds the imparted "Tag" in the storage resource (for instance, a buffer or a register). In the case in which the receiver 41A receives a response write packet to the post-modification write packet based on a flow described later, and "Tag" equivalent to "Tag" in the response write packet is found from the storage resource for a tag, the receiver 41A can recognize that a response in relation to the post-modification write packet is received. The storage resource for a tag can also be stored in such a manner that the imparted "Tag" is corresponded to "Tag" in a pre-modification write packet.

The format modifying processing in accordance with this mode of the present invention is a processing in which the format modifying section 141 generates the post-modification write packet by modifying a part of a header section contained in the pre-modification write packet (a header section shown in FIG. 5A) to another information element. An information element that is modified is "Requestor ID". More specifically, as shown in FIG. 5B, "Requestor ID" is rewritten to be an information element including an information element "Kind" and an information element "Source ID". Further specifically, although "Requestor ID" is entered in a predetermined field 72 of 16 bytes as shown in FIG. 5A, the upper section of "Requestor ID" is rewritten to be "Kind" and the lower section of "Requestor ID" is rewritten to be "Source ID" by carrying out the format conversion processing.

The "Source ID" is an information element that is generated based on "Requestor ID" entered before the format modifying processing and that is corresponding to "Requestor ID".

The "Kind" is an information element that specifies what kind of a write assurance processing is carried out by the transmitter in the PCI-EX control module connected to a storage resource of a write destination (the local memory 32 in the illustration of FIG. 4B). A value of the "Kind" is a value based on a judgment result of a Window judgment processing. In the case in which Window 1 is judged in the Window judgment processing, a value of the "Kind" is a value representing that a write completion assurance processing is carried out as a write assurance processing (for instance, 0001). On the other hand, in the case in which Window 2 is judged in the Window judgment processing, a value of the "Kind" is a value representing that a compare assurance processing is carried out as a write assurance processing (for instance, 0010).

The "Requestor ID" is an information element that is not so affected even if it is rewritten among information elements of a plurality of kinds contained in a header section of a write packet of the PCI-EX standard format (that is, a pre-modification write packet). As an attention is focused on this factor, in this mode of the present invention, an information element "Source ID" corresponding to "Requestor ID" is set to the field 72 of a predetermined size that is ensured in advance as a region in which "Requestor ID" is entered for a header section of the pre-modification write packet, and "Kind" is also set to the field 72. Consequently, it can be specified to carry out a write assurance processing to the transmitter in the PCI-EX control module connected to a storage resource of a write destination without deleting a part of the write targeted data contained in a data section and without adding an information element to the data section.

Figure 5B:
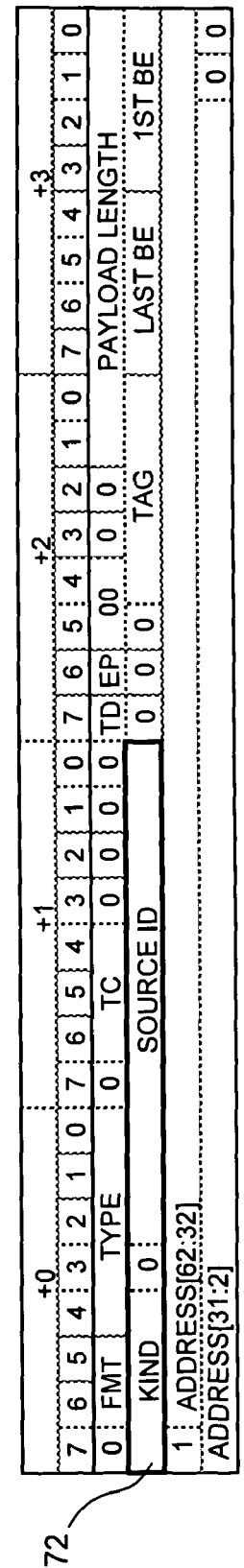
FIG. 5B is a view showing a header section of a post-modification write packet.

FIG. 5B shows a configuration of a header section of a post-modification write packet. As described above, the "Tag" included in the header section is "Tag" imparted by the tag imparting processing.

The explanation of FIG. 4A is returned again.

The receiver 41A receives a pre-modification write packet from the MP control module 11, and carries out the Window judgment processing, the tag imparting processing, and the format modifying processing that are described above. Subsequently, the receiver 41A outputs a post-modification write packet to the packet switch module 57. The packet switch module 57 receives the post-modification write packet output from the receiver 41A, and outputs the post-modification write packet to the transmitter 45B based on "Address" in the post-modification write packet. The transmitter 45B transfers the post-modification write packet output from the packet switch module 57 to a receiver 61A in another storage control device 60 as shown in FIG. 4B.

The receiver 61A receives the post-modification write packet output from the transmitter 45B, and outputs the post-modification write packet to the packet switch module 67. The packet switch module 67 outputs the post-modification write packet to the transmitter 59B (that is, the transmitter 59B in the PCI-EX control module 59 connected to the MP control module 31 provided with the local memory 32 of a write destination) based on "Address" in the post-modification write packet.

When the transmitter 59B receives the post-modification write packet, the packet analysis section 145 in the transmitter 59B (see FIG. 13A) carries out a packet analysis processing. In the packet analysis processing, it is specified that the "Kind" contained in the received post-modification write packet specifies which of a write completion assurance processing and a compare assurance processing is carried out as a write assurance processing.

The transmitter 59B writes a write targeted data contained in the post-modification write packet to a region in the local memory 32 indicated by "Address" in the post-modification write packet (more specifically, the post-modification write packet is transferred to the local memory 32).

The write assurance processing section 146 in the transmitter 59B carries out a write assurance processing specified by the packet analysis section 145. A write assurance processing to be carried out is either of a write completion assurance processing and a compare assurance processing as described above. FIG. 4B shows a write completion assurance processing. More specifically, in the case in which a write targeted data contained in the post-modification write packet has been written to the local memory 32, the write assurance processing section 146 generates and transmits a response write packet to the post-modification write packet. The response write packet is a Posted packet containing a write code, that is, a write packet. The header section of the response write packet contains "Tag" equivalent to "Tag" in the post-modification write packet, a write code as "Type", and an ID of the transmitter 59B as "Requestor ID" for instance. As shown in FIGS. 4A and 4B, the response write packet is returned to the receiver 41A that is a transmitting source of the post-modification write packet through a route equivalent to a route on which the post-modification write packet has flown. The more specific explanation is as follows. A unique port number (hereafter referred to as PN) is allocated to the PCI-EX control module and the memory control module that are connected to the packet switch module 56 (67). In FIG. 4A, when the receiver 41A transmits the post-modification write packet, the receiver 41A also transmits a PN of its own PCI-EX control module 41 (hereafter referred to as PN#41). In the case in which the transmitter 45B receives the post-modification write packet and PN#41 from the receiver 41A, the transmitter 45B holds a TAG in the post-modification write packet and PN#41 in such a manner that the TAG in the post-modification write packet and PN#41 are associated with each other (for instance, the TAG in the post-modification write packet and PN#41 are stored in a storage resource such as a buffer). Subsequently, the transmitter 45B transmits the post-modification write packet that has been received and a PN of its own PCI-EX control module 45 (hereafter referred to as PN#45). Such a processing is repeated in FIG. 4B. As a result, the receiver 61A holds an association of a TAG and PN#45, and the transmitter 59B holds an association of a TAG and PN#61. In the case in which the transmitter 59B transmits a response write packet including a TAG equivalent to a TAG in the post-modification write packet that has been received, the transmitter 59B specifies PN#61 associated with the TAG to transmit the response write packet. Consequently, the response write packet is received by the transmitter 61A. The transmitter 61A specifies PN#45 associated with a TAG in the response write packet that has been received, and transmits the response write packet. Consequently, the response write packet is received by the transmitter 45B. The transmitter 45B specifies PN#41 associated with a TAG in the response write packet that has been received, and transmits the response write packet. Consequently, the response write packet is received by the transmitter 41A. The transmitter 41A recognizes that a response of the post-modification write packet is returned by the TAG in the response write packet. As described above, the response write packet is returned to the receiver 41A that is a transmitting source of the post-modification write packet through a route equivalent to a route on which the post-modification write packet has flown.

As shown in FIG. 4A, when the receiver 41A receives the response write packet, the write completion report section 144 in the receiver 41A judges whether a tag equivalent to "Tag" in the response write packet is stored in a storage resource for a tag. In the case in which a result of the judgment is positive, the write completion report section 144 carries out a write completion report processing. The write completion report processing is a processing for notifying the processor 14 that is a transmitting source of the pre-modification write packet of a completion of a write according to the pre-modification write packet. By carrying out the write completion report processing, a completion of a write that conforms to the pre-modification write packet can be detected by the processor 14.

Figure 6:
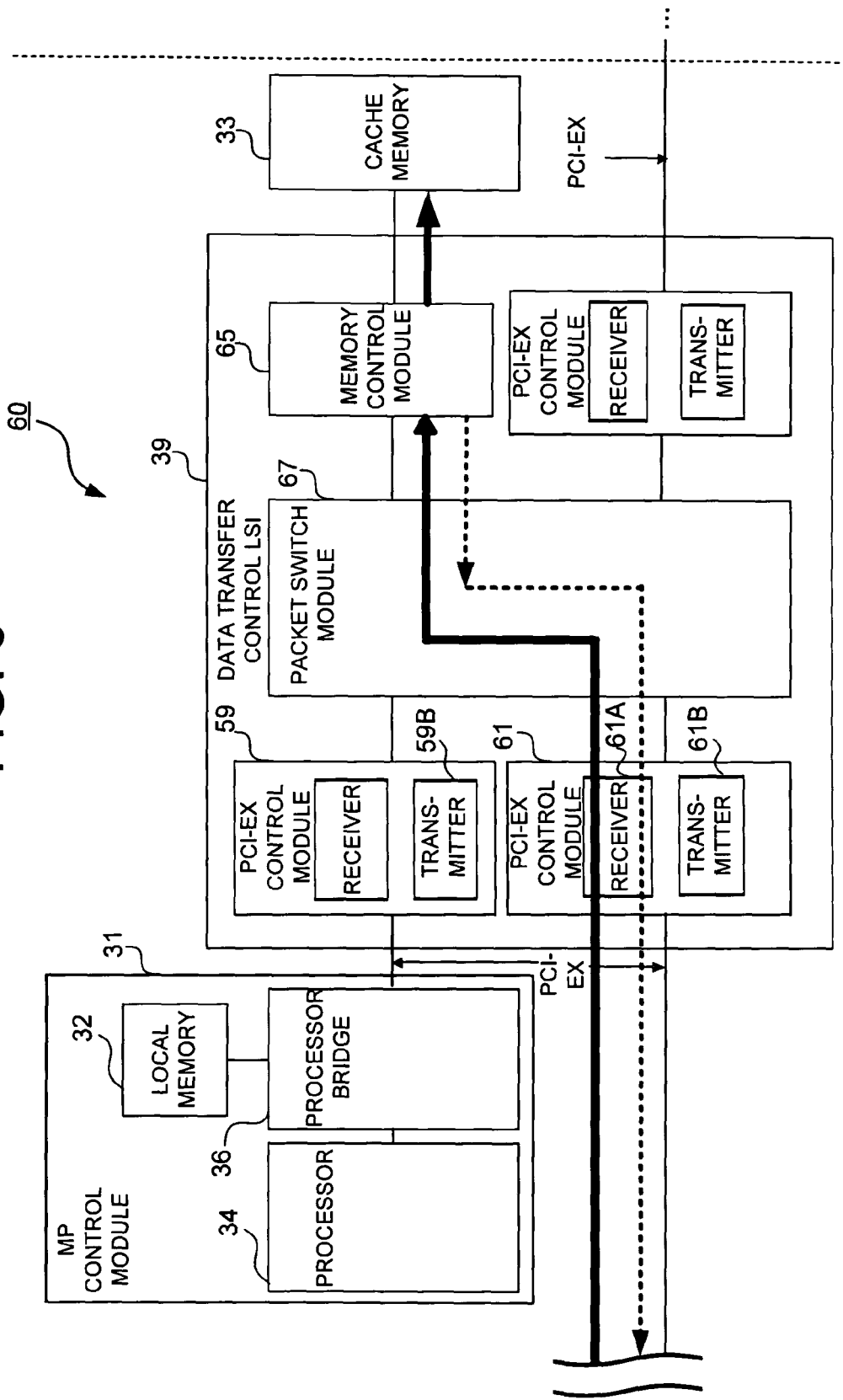
FIG. 6 is a view showing a storage control device in which a write destination is a cache memory and a write assurance processing is carried out.

By the processing flow explained above with reference to FIGS. 4A and 4B, a destination of the pre-modification write packet (a storage resource of a write destination) is a local memory 32 in the storage control device 60 different from the storage control device 30 provided with the processor 14 that issues the pre-modification write packet. However, as shown in FIG. 6, a destination of the pre-modification write packet can also be a cache memory 33 in the storage control device 60. As a case in which the cache memory 33 is a destination of the pre-modification write packet as described above, a case provided with the following (6A-1) and (6A-2) can be mentioned for instance.

(6A-1) The host IF 9A or 9B receives a write command from any of the hosts 1A to 1D.

(6A-2) By a method in which the processor 14 refers to configuration information stored in the cache memory 13 (or a storage resource of another kind) (for instance, information indicating that which of logical volumes is configured based on which of HDD groups, and that which of HDD groups is connected to which of storage control devices), it can be found that the HDD group that is a basis of a logical volume specified by the received write command is not connected to the storage control device 30 but connected to the storage control device 60.

By an example shown in FIG. 6, a write destination is a cache memory 33. In this case, a processing that is carried out by the packet analysis section 145 and the write assurance processing section 146 in the transmitter 59B and that is explained with reference to FIG. 4B can also be carried out by the packet analysis section 147 and the write assurance processing section 148 in the memory control module 65 (see FIG. 13B).

By the processing flow explained above with reference to FIGS. 4A and 4B, a write completion assurance processing is carried out as a write assurance processing. However, in the case in which the "Kind" contained in the post-modification write packet is a value that specifies a compare assurance processing, a compare assurance processing is carried out as a write assurance processing as substitute for a write completion assurance processing.

Figure 7:
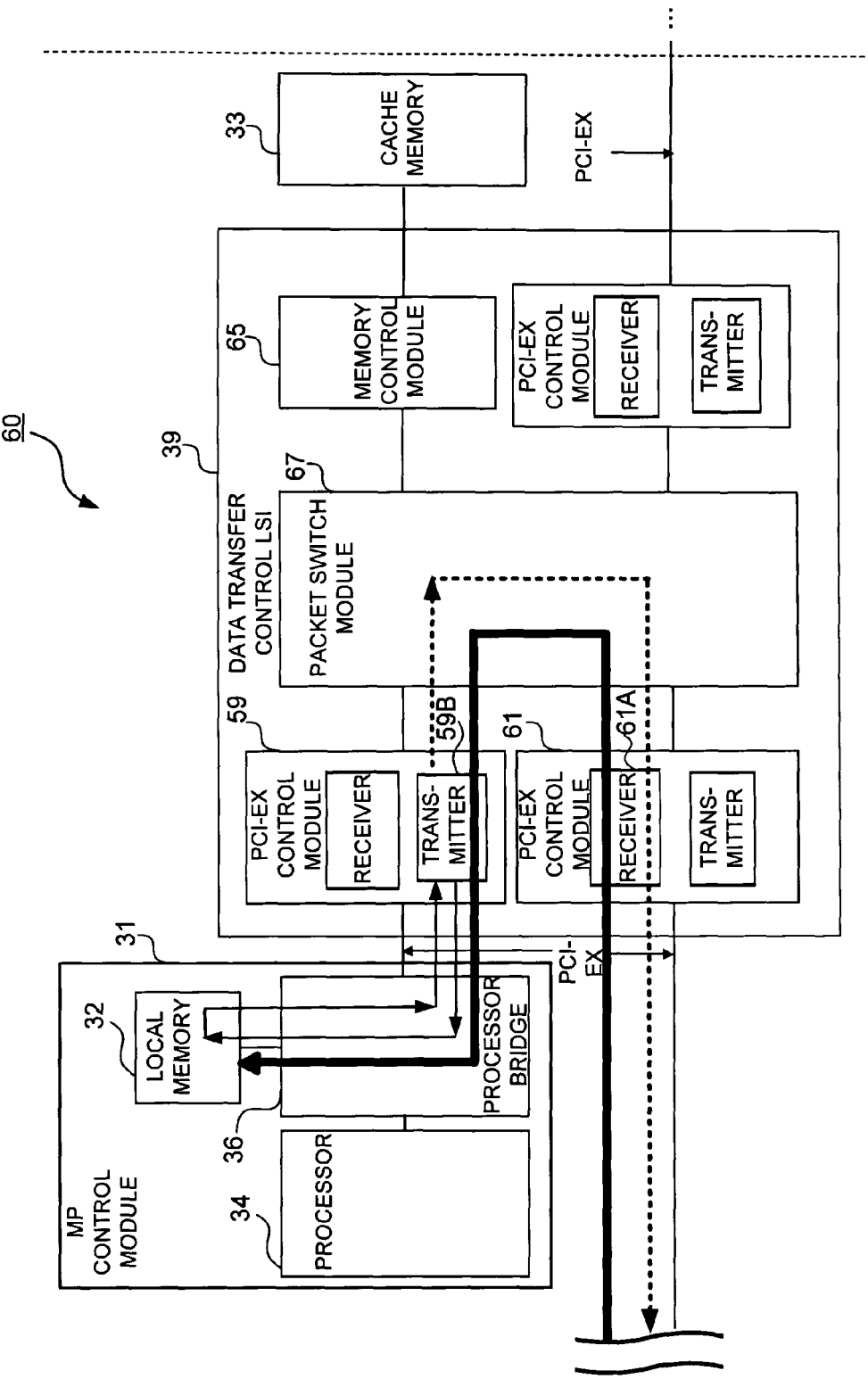
FIG. 7 is a view showing a storage control device in which a write destination is a local memory and a compare assurance processing is carried out.

More specifically, as shown in FIG. 7 for instance, in the case in which a write targeted data in the post-modification write packet is written to a region of the local memory 32 (hereafter referred to as a region T), the write assurance processing section 146 in the transmitter 59B reads the write targeted data from the region T of the local memory 32 (for instance, a read packet that is directed to the region T of the local memory 32 (a Non-Posted packet) is transmitted, and a Completion packet containing the write targeted data that has been read is received to the read packet). The write assurance processing section 146 compares the write targeted data that has been read and the write targeted data that has been written to the local memory 32 (for instance, the write targeted data that is temporarily stored in the storage resource (such as a buffer) contained in the transmitter 59B). The write assurance processing section 146 generates and transmits a response write packet including the information that indicates a result of the comparison. For instance, in the case in which a result of the comparison is a match, a response write packet including the information that indicates OK is generated. In the case in which a result of the comparison is a mismatch, a response write packet including information that indicates NG is generated. In this case, for the receiver 41A that is a transmitting source of the post-modification write packet, a write completion report processing is carried out in the case in which a response write packet including the information that indicates OK is received.

Figure 8:
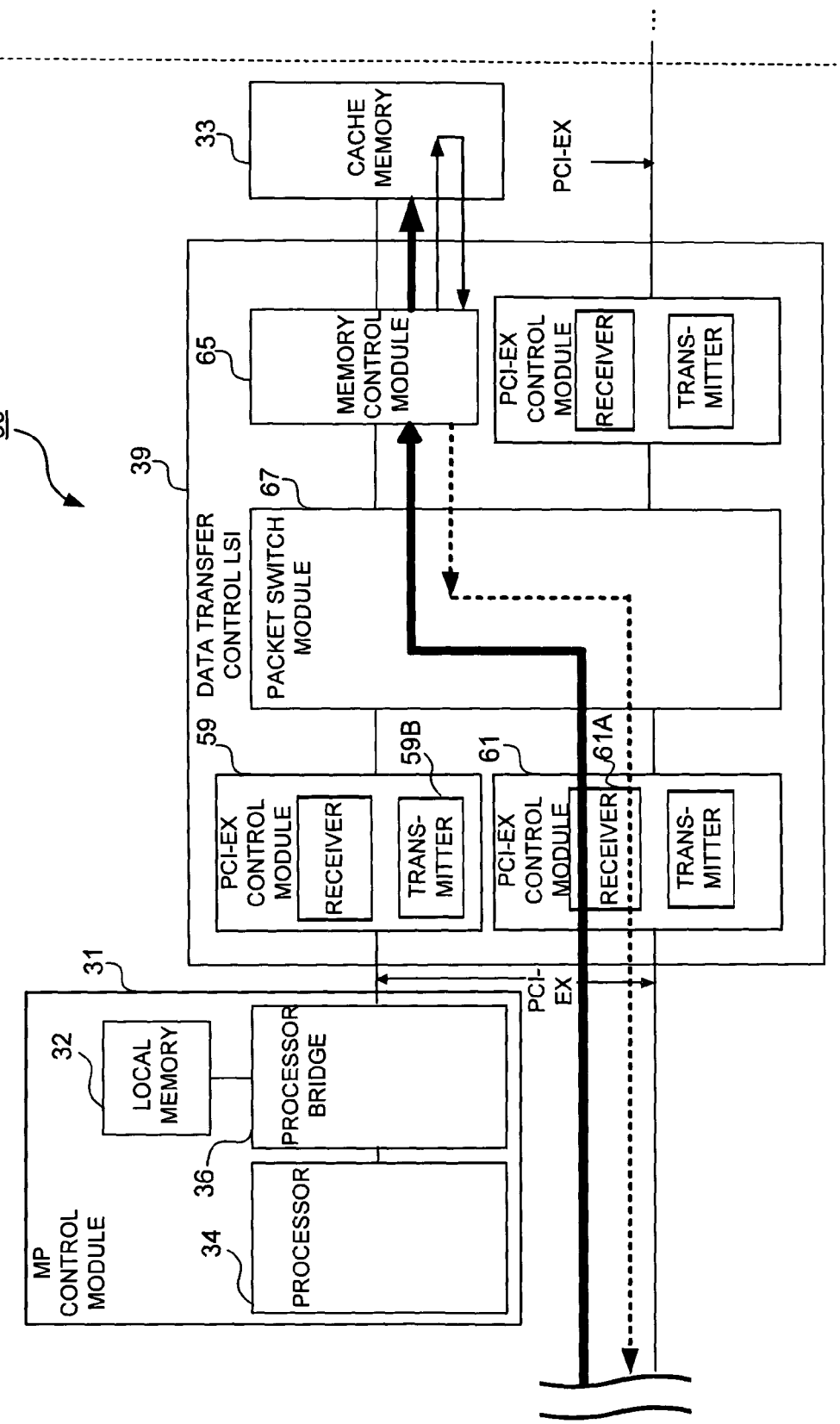
FIG. 8 is a view showing a storage control device in which a write destination is a cache memory and a compare assurance processing is carried out.

A compare assurance processing can be carried out even in the case in which a write destination is a cache memory 33 as shown in FIG. 8.

In the case in which a response write packet as a result of a write assurance completion processing or a response write packet including the information that indicates OK is received by the receiver 41A that is a transmitting source of the post-modification write packet, the write completion report section 144 in the receiver 41A carries out a write completion report processing as described above. As a write completion report processing, any of a first write completion report processing to a third write completion report processing that are described below can be adopted for instance. Each of the write completion report processing will be explained in the following.

<First Write Completion Report Processing>

Figure 9:
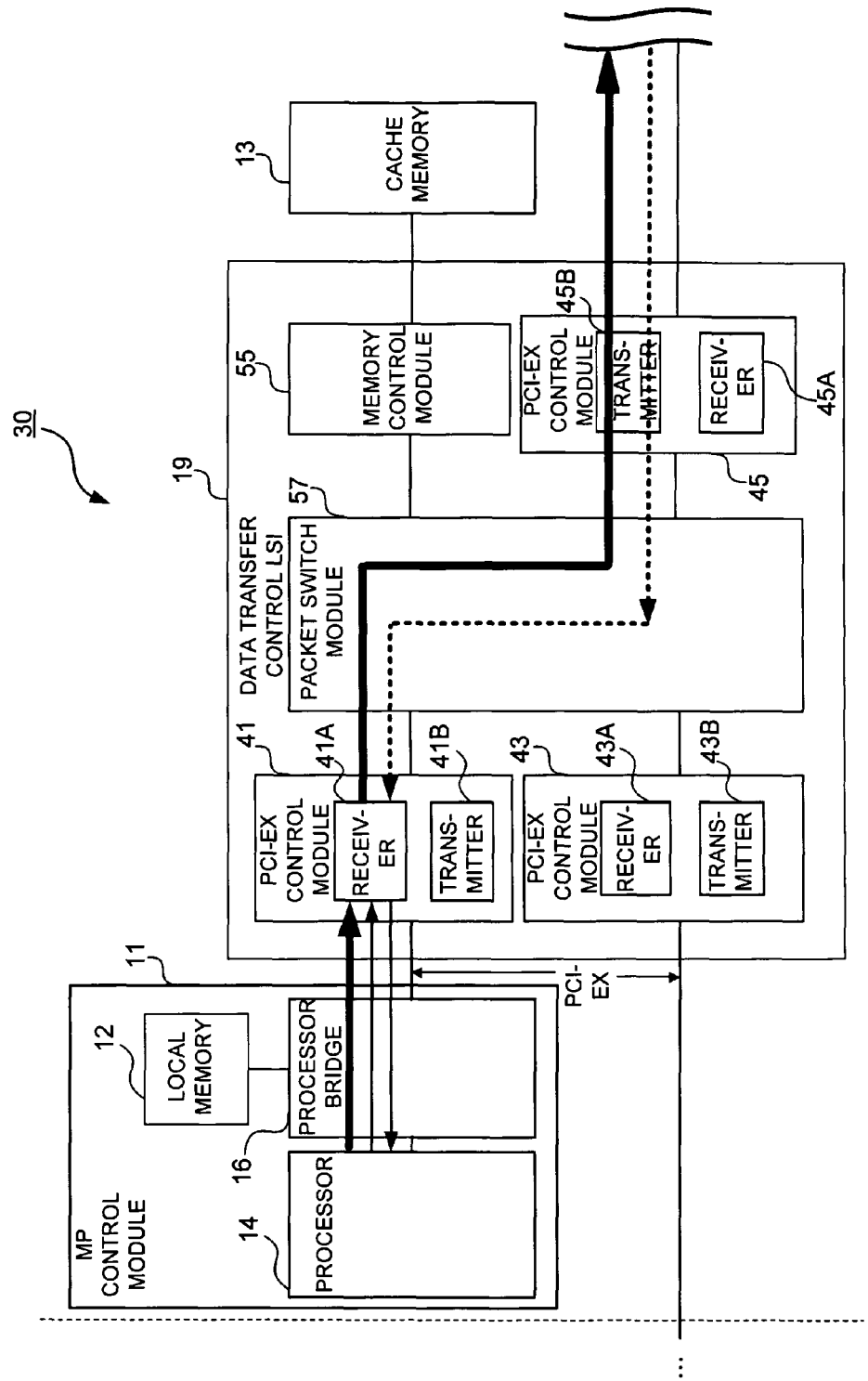
FIG. 9 is a view showing a storage control device in which a first write completion report processing is carried out.

In the case in which the post-modification write command is issued, the format modifying section 141 of the receiver 41A sets '1' as a write completion bit to a register in the receiver 41A (hereafter referred to as a receive register) (for instance, a correspondence of the write completion bit '1' and "Tag" in the post-modification write command that has been issued is managed). Subsequently, in the case in which the receiver 41A receives the response write command corresponding to the post-modification write command, as shown in FIG. 9, the write completion report section 144 in the receiver 41A updates the write completion bit that has been set to the receive register from '1' to '0'. The processor 14 checks the receive register periodically (carries out polling), the processor 14 detects a write completion corresponding to a pre-modification write packet in the case in which the processor 14 detects a write completion bit '0' in the receive register.

<Second Write Completion Report Processing>

Figure 10:
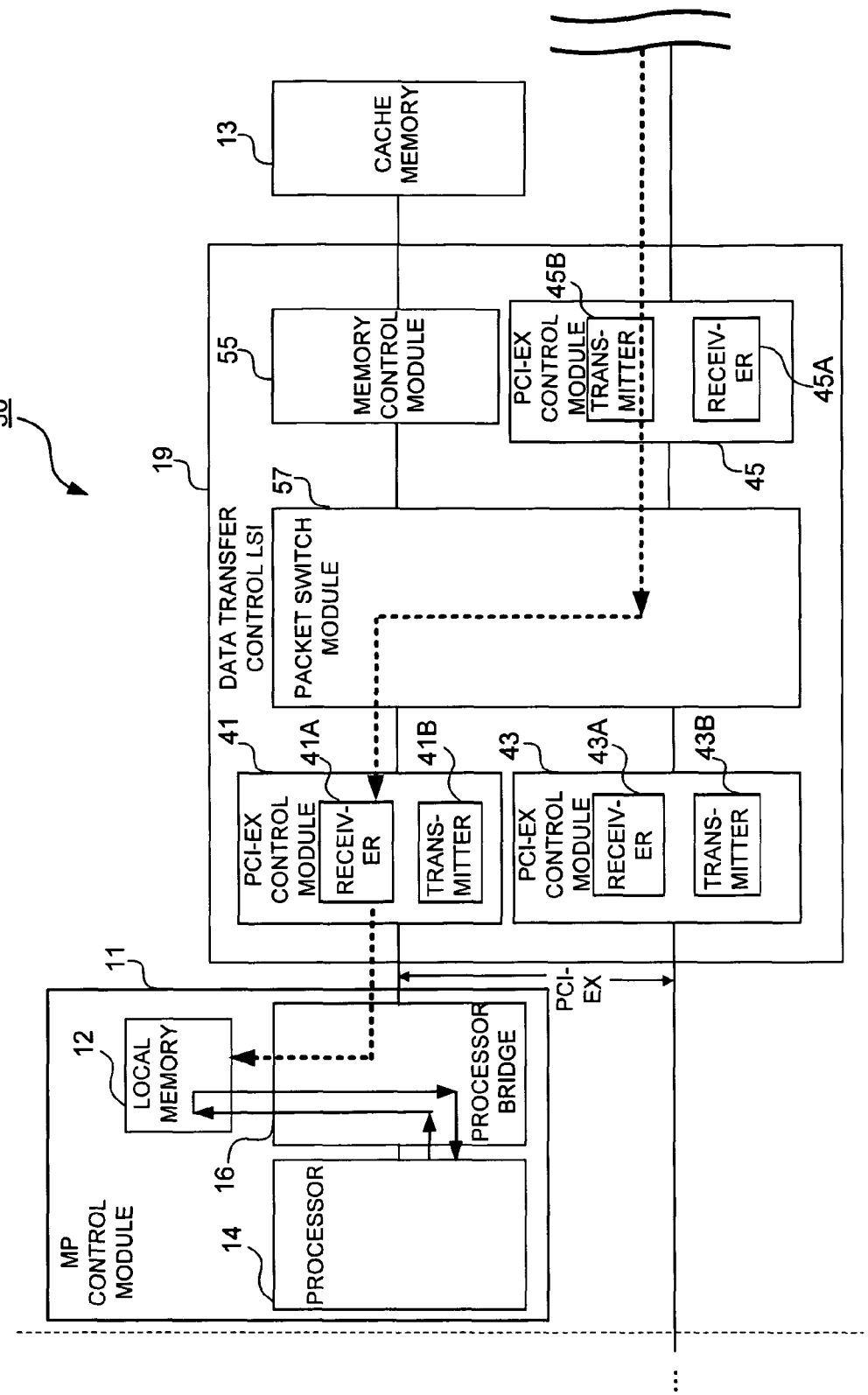
FIG. 10 is a view showing a storage control device in which a second write completion report processing is carried out.

As shown in FIG. 10, the write completion report section 144 in the receiver 41A writes the information indicating a write completion (hereafter referred to as write completion information) to the local memory 12 in the MP control module 11 provided with the processor 14 that issues the pre-modification write packet. The processor 14 checks the local memory 12 periodically (carries out polling), and obtains the write completion information corresponding to the issued pre-modification write packet from the local memory 12. Consequently, a write completion corresponding to a pre-modification write packet is detected. The write completion information includes "Tag" in the pre-modification write packet and the status information (OK) for instance. The "Tag" is a "Tag" in the pre-modification write packet, and the "Tag" is obtained from a storage resource for a tag using a "Tag" in the response write packet as a key for instance. The status information (OK) is status information included in a data section of the response write packet as a write targeted data for instance. The processor 14 detects a write completion in the case in which the processor 14 obtains the write completion information that includes a "Tag" equivalent to a "Tag" in the pre-modification write packet.

<Third Write Completion Report Processing>

Figure 11:
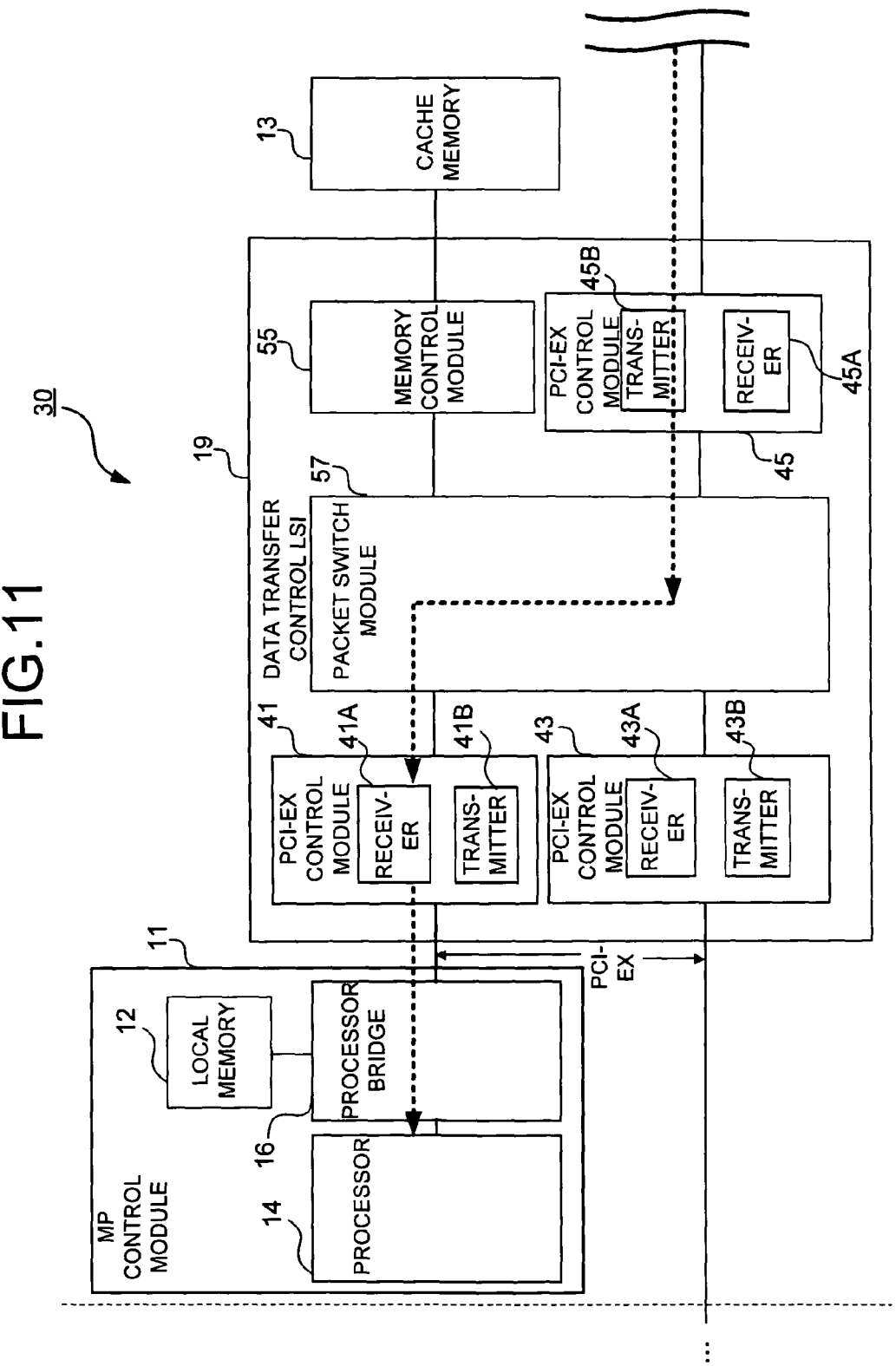
FIG. 11 is a view showing a storage control device in which a third write completion report processing is carried out.

As shown in FIG. 11, the write completion report section 144 in the receiver 41A outputs a termination interrupt signal that is a signal representing that data has written normally to the processor 14. The processor 14 detects a write completion in the case in which the processor 14 receives the termination interrupt signal.

By carrying out any of the first write completion report processing to the third write completion report processing that are described above, the write completion report section 144 in the receiver 41A can notify the processor 14 of a write completion in the case in which the receiver 41A receives a response write packet.

Figure 14:
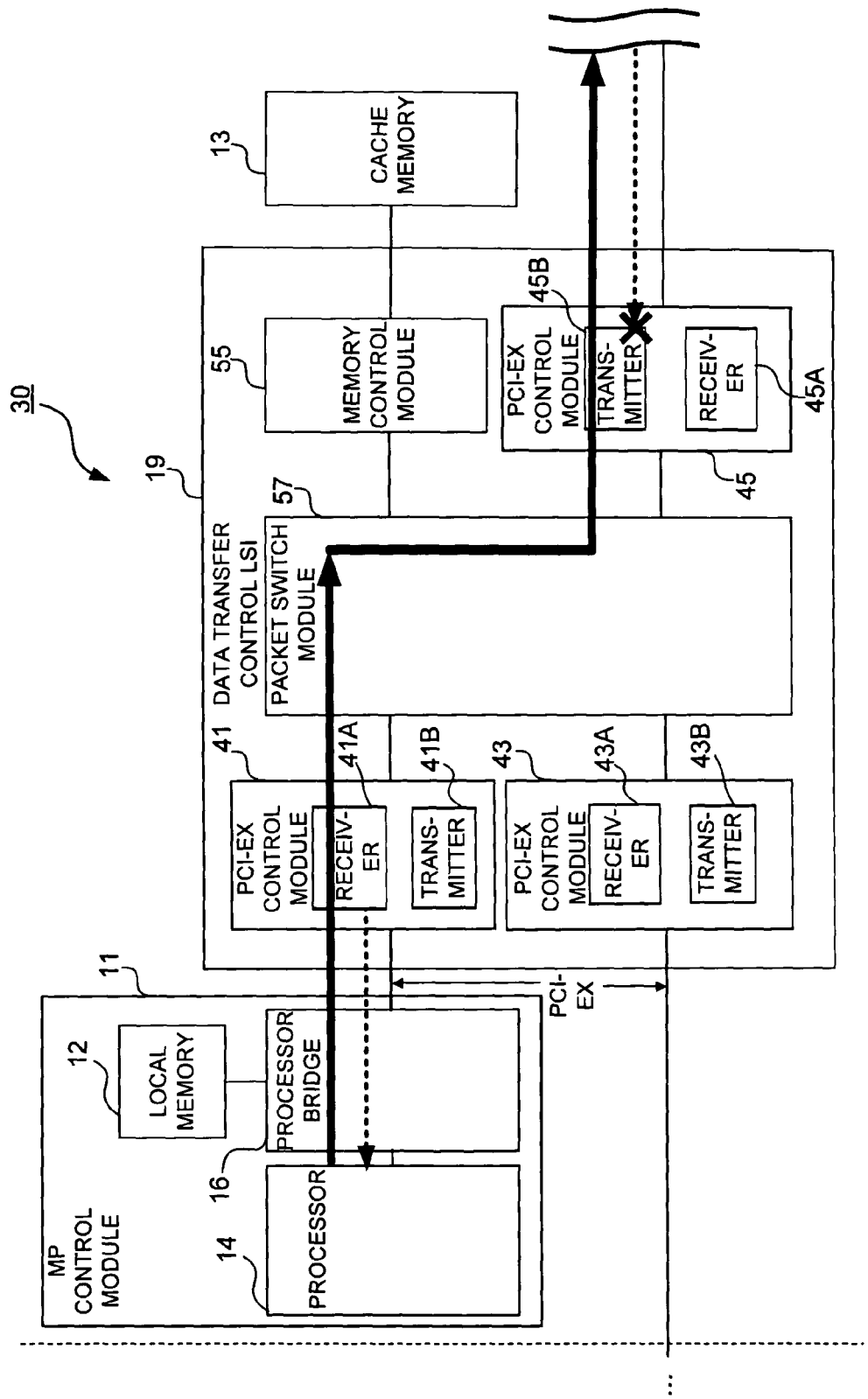
FIG. 14 is a view showing a storage control device in which an error is reported to a processor in the case in which a post-change write packet is transmitted and a time out occurs.

The receiver 41A measures a time elapsed after the post-modification write packet is transmitted. In the case in which the receiver 41A does not receive a response write packet within a predetermined time (for instance, as shown in FIG. 14, in the case in which a response write packet is not received by the receiver 41A since an obstacle occurs in the transmitter 45B on the route of a response write packet), an error is reported to the processor 14 as shown in FIG. 14.

Figure 15:
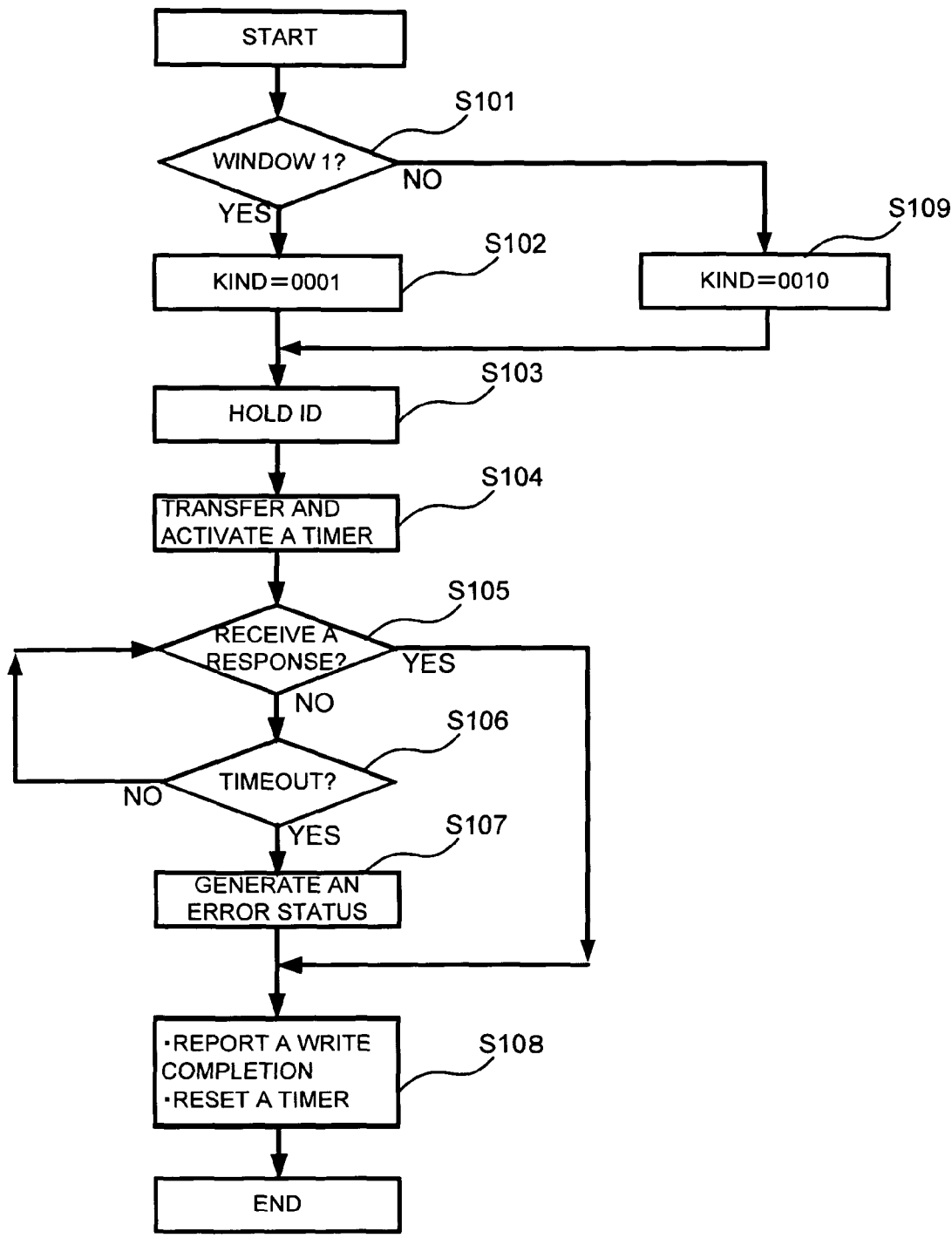
FIG. 15 is view showing a flow of processing carried out by a receiver in a PCI-EX control module.

FIG. 15 is view showing a flow of processing carried out by the receiver 41A. This flow can also be applied to a receiver in a PCI-EX control module other than the PCI-EX control module 41 provided with the receiver 41A.

The receiver 41A carries out a Window judgment processing in the case in which the receiver 41A receives the pre-modification write packet (S101).

In the case in which a result of the Window judgment processing of S101 is that an assurance specification address resides in Window 1 (S101: YES), a value '0001' as "Kind" presenting that a write completion assurance processing is carried out is obtained (S102). On the other hand, in the case in which a result of the Window judgment processing of S101 is that an assurance specification address resides in Window 2 (S101: NO), a value '0010' as "Kind" presenting that a compare assurance processing is carried out is obtained (S109).

The receiver 41A holds "Tag" (ID) by carrying out a tag imparting processing (S103).

The receiver 41A issues "Tag" obtained in S103 and a post-modification write packet including "Kind" obtained in S102 or S109 (that is, the receiver 41A carries out a format modifying processing), and activates a timer (S104).

The receiver 41A carries out S108 in the case in which the receiver 41A receives a response write packet (S105: YES). More specifically, in the case in which a write packet that includes a "Tag" equivalent to the held "Tag" is received for instance, the receiver 41A receives a response write packet thereby.

The receiver 41A generates an error status (S107) in the case in which the receiver 41A does not receive a response write packet corresponding to a post-modification write packet within a predetermined time after the post-modification write packet is transmitted (S105: NO, S106: YES).

The receiver 41A carries out a write completion report after S107 or YES of S105, and resets a timer (S108). In the write completion report after S107, an error is reported. In the write completion report after YES of S105, any of the first write completion report processing to the third write completion report processing that are described above is carried out.

Figure 16:
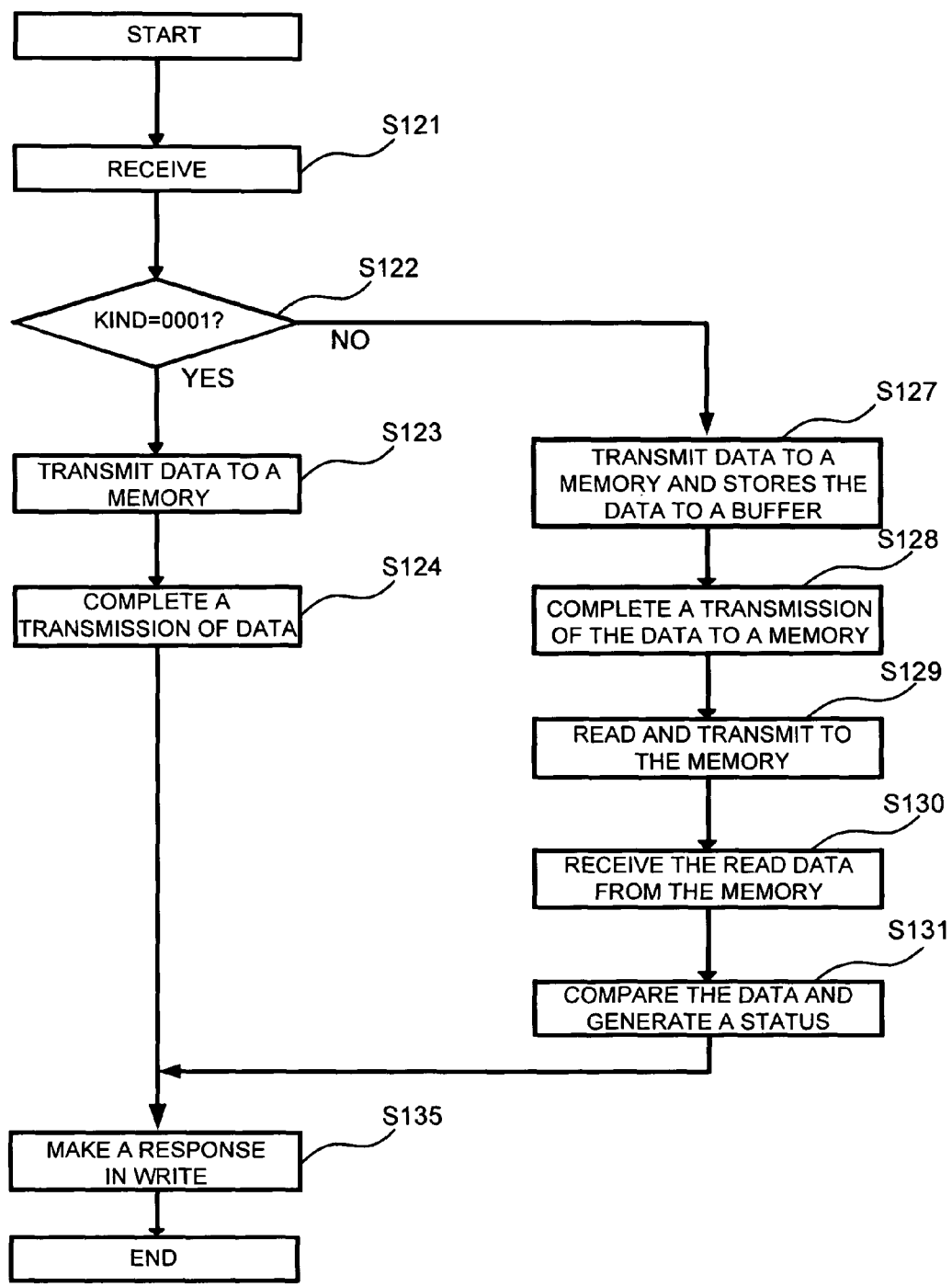
FIG. 16 is view showing a flow of processing carried out by a transmitter in a PCI-EX control module.

FIG. 16 is view showing a flow of processing carried out by the transmitter 59B. This flow can also be applied to a transmitter in a PCI-EX control module other than the PCI-EX control module 59 provided with the transmitter 59B and a memory control module.

The transmitter 59B receives a post-modification write packet (S121), and checks "Kind" in the post-modification write packet.

In the case in which "Kind" that has been checked is '0001' (S122: YES), that is, in the case in which a write completion assurance processing is specified, the transmitter 59B transmits a write targeted data in the post-modification write packet to a local memory of a write destination (S123) (the write destination is a cache memory in the case in which a main constituent of each processing in this flow is a memory control module). More specifically, for instance, the transmitter 59B transmits the post-modification write packet to a local memory, or generates a write packet (Posted packet) that includes a write targeted data in the post-modification write packet and that is directed to a local memory, and transmits the write packet. When the transmitter 59B completes a transmission of the write targeted data (S124), the transmitter 59B returns a response in write (S135). That is, the transmitter 59B generates and transmits the response write packet described above.

In the case in which "Kind" that has been checked is '0010' (S122: NO), that is, in the case in which a compare assurance processing is specified, the transmitter 59B transmits a write targeted data in the post-modification write packet to a local memory of a write destination, and temporarily stores the write targeted data to a buffer included in the transmitter 59B (S127). When the transmitter 59B completes a transmission of the write targeted data (S128), the transmitter 59B reads the write targeted data that has been transmitted in S127 from the local memory (S129). More specifically, for instance, the transmitter 59B transmits a read packet (Non-Posted packet) in which a write destination of the write targeted data is specified. In the case in which the transmitter 59B obtains a read targeted data (that is, the write targeted data that has been transmitted in S127) (S130), the transmitter 59B compares the write targeted data stored in the buffer and data obtained in S130, and generates the information that represents a result of the comparison. Subsequently, the transmitter 59B generates and transmits a response write packet that includes the information (S135).

While the preferred modes in accordance with the present invention have been described above, the present invention is not restricted to the modes, and various changes, modifications, and functional additions can be thus made without departing from the scope of the present invention.

For instance, in place of the configuration in which the storage control devices are connected in series, a plurality of storage control devices can be connected to one switch circuit, and the transmission and reception of a packet between storage control devices can be carried out via the switch circuit.

Moreover, for instance, in place of the first write completion report processing to the third write completion report processing, a fourth write completion report processing shown in FIG. 17 can also be carried out. In this case, data that has been read in a compare assurance processing is included in a response write packet (or a write targeted data can be read from a memory of a write destination without a compare intended). The receiver 41A that has received the response write packet writes a write targeted data in the response write packet (that is, data that has been read from a memory of a write destination) to the local memory 12. The processor 14 checks the local memory 12, and checks whether data equivalent to the write targeted data included in a pre-modification write packet issued by the processor 14 itself is stored in the local memory 12 or not. In the case in which the same data is detected, a write completion is detected.

What is claimed is:

1. A storage system comprising:
a plurality of storage devices; and
a controller module connected to the plurality of storage devices,
wherein the controller module comprising:
at least one processor module that transmits a write packet;
at least one storage resource; and
at least one transfer control module connected to the processor module and the storage resource,
each of the at least one transfer control module comprising:
a receiver; and
a transmitter, wherein
(1-1) the receiver receives the write packet from the processor module, and transmits a write packet provided with the following (1-A) to (1-D) based on the write packet received from the processor module,
(1-A) a write code that is a code representing a write;
(1-B) a specific code that is one of a first specific code or a second specific code;
(1-C) a write targeted data;
(1-D) a destination information indicating a storage resource of a write destination, and
(1-2) in the case in which the transmitter connected the storage resource of the write destination receives a write packet, the transmitter connected the storage resource of the write destination writes the write targeted data in the received write packet to the storage resource indicated by the destination information in the packet, and
(1-2-1) if the received write packet includes the first specific code, the transmitter generates a response packet that represents a write completion in a situation where the specific code is the first specific code and a write of the write targeted data is terminated, and
(1-2-2) if the received write packet includes the second specific code, the transmitter reads the write targeted data from the write destination after a write operation of the write targeted data is terminated, compares data that has been read with the write targeted data provided by the received write packet, and generates a response write packet, the response write packet representing a write completion in a situation where the specific code is the second specific code if the data that has been read matches the write targeted data and representing a write failure if the data that has been read does not match the write targeted data.

2. The storage system according to claim 1, wherein the controller module is configured by a plurality of controllers, the plurality of controllers are connected in series,
a communication that conforms to the PCI-Express (PCI-EX) standard is carried out between the controllers,
each controller comprising:
the transfer control module that control a transfer of a packet;
a storage device interface module connected to the transfer control module; and
a processor module connected to the transfer control module,
each processor module comprising:
a microprocessor; and
a local memory,
each storage resource is a cache memory or the local memory,
the cache memory is connected to the transfer control module,
the storage device interface module is connected to at least one of the plurality of storage devices, at least one of the plurality of controllers is provided with an external device interface module that receive an I/O command from a external device, the external device interface module is connected to the transfer control module in the controller provided with the external device interface module, the transfer control module is provided with a plurality of PCI-EX control modules and a memory control module connected to the cache memory, each PCI-EX control module is connected to any of the external device interface module, the storage device interface module, the processor module, and the transfer control module in the adjacent controller, a first PCI-EX control module that is a PCI-EX control module connected to the processor module and a second PCI-EX control module that is a PCI-EX control module connected to another controller among the plurality of PCI-EX control modules are provided with the receiver and the transmitter, the write packet is a Posted packet, the response packet is a response write packet that is a Posted packet including a write code, the processing of the following (2-1) and (2-2) is carried out as the (1-1) in a first controller that is a controller provided with the processor that is a transmitting source, (2-1) the receiver included in the first PCI-EX control module receives a write packet of a first kind provided with the following (2-A) to (2-D) from the microprocessor;

(2-A) the (1-A);

(2-B) requester ID that is an ID representing a transmitting source;

(2-C) the (1-C);

(2-D) the (1-D);

(2-2) the receiver receives the write packet of a first kind, converts the received write packet of a first kind into a write packet of a second kind, and transmits the write packet of a second kind;

(2-3) the transmitter included in the second PCI-EX control module that is directly or indirectly connected to a second controller that is a controller provided with the storage resource of a write destination receives the write packet of a second kind and transmits the write packet of a second kind, the write packet of a second kind is a write packet in which a specific code that is the (1-B) and a source ID corresponding to the requester ID in place of the requester ID are entered in a field of a range that can record the requester ID, the processing of the following (2-4) and (2-5) is carried out as the (1-2) in the second controller, (2-4) the receiver included in the second PCI-EX control module receives the write packet of a second kind transmitted in the (2-3) directly from the first controller or via the second PCI-EX control module in a controller that is connected to the first controller, and transmits the received write packet of a second kind, the transmitted write packet of a second kind reaches the memory control module in the case in which the storage resource of a write destination is a cache memory, and reaches the first PCI-EX control module in the case in which the storage resource of a write destination is a local memory, (2-5) the memory control module that has received the write packet of a second kind or the transmitter included in the first PCI-EX control module writes the write targeted data in the received write packet of a second kind to the cache memory or the local memory indicated by the destination information in the write packet of a second kind in the case in which the received write packet of a second kind is a write packet including a write code and includes the specific code, generates the response write packet that is a Posted packet including a write code as a packet representing a completion of a write, and transmits the generated response write packet, the response write packet that has been transmitted in the (2-5) reaches the receiver included in the first PCI-EX control module in the transfer control module in the first controller through a route on which the write packet of a second kind has flown, and the receiver carries out a write completion report processing in the case in which the receiver receives the response write packet representing a write completion, whereby the microprocessor detects a write completion.

3. The storage system according to claim 2, wherein the microprocessor includes an address that resides in a first address range in the write packet of a first kind in the case in which a first write assurance function is specified, and includes an address that resides in a second address range that does not overlap on the first address range in the write packet of a first kind in the case in which a second write assurance function is specified, in the (2-2), the receiver included in the first PCI-EX control module includes a first specific code as the specific code in the case in which the address that resides in a first address range is included in the write packet of a first kind, and includes a second specific code as the specific code in the case in which the address that resides in a second address range is included in the write packet of a first kind, and in the (2-5), the memory control module or the transmitter included in the first PCI-EX control module (3-1) generates the response write packet representing a completion of a write in the case in which the specific code is a first specific code and a write of the write targeted data is terminated, and (3-2) reads the write targeted data from the write destination, and compares data that has been read and the write targeted data in the case in which the specific code is a second specific code and a write of the write targeted data is terminated, and generates the response write packet representing a write completion in the case in which the data matches to each other.

4. The storage system according to claim 2, wherein the receiver that is included in the first PCI-EX control module in the first controller and that has received the response write packet writes the write completion information indicating a write completion to a register included in the receiver as the write completion report processing, and the microprocessor included in the processor module in the first controller detects a completion of a write by obtaining the write completion information from the register of the receiver included in the first PCI-EX control module.

5. The storage system according to claim 2, wherein the receiver that is included in the first PCI-EX control module in the first controller and that has received the response write packet writes the write completion information indicating a completion of a write to the local memory included in the processor module as the write completion report processing, and the microprocessor included in the processor module in the first controller detects a completion of a write by obtaining the write completion information from the local memory.

6. The storage system according to claim 2, wherein the receiver that is included in the first PCI-EX control module in the first controller and that has received the response write packet outputs an interrupt signal to the microprocessor included in the processor module as the write completion report processing, and the microprocessor detects a completion of a write by receiving the interrupt signal.

7. The storage system according to claim 2, wherein after a write of the write targeted data is terminated, the memory control module or the transmitter included in the first PCI-EX control module reads the write targeted data from the write destination, and generates the response write packet including the read data that is data that has been read in the (2-5), the receiver that is included in the first PCI-EX control module in the first controller and that has received the response write packet writes the read data in the response write packet to the local memory included in the processor module as the write completion report processing, and the microprocessor included in the processor module in the first controller obtains the read data from the local memory.

8. The storage system according to claim 2, wherein the microprocessor in the first controller issues the write packet of a first kind that is directed to the cache memory in the second controller connected to a storage device that is a basis of a logical volume specified by the write command in the case in which the first controller receives a write command from an external device, and the write targeted data that is included in the issued write packet and that conforms to the write command is written to the cache memory in the second controller in the (2-5).

9. The storage system according to claim 1, wherein the write packet that is transmitted from the processor module is a packet having a format that conforms to a predetermined communication standard, and the receiver receives the write packet having the format that conforms to the predetermined communication standard and enters the specific code in the specific field of a header of the write packet, thereby generating a write packet including the specific code.

10. The storage system according to claim 9, wherein the specific field is a field to which an ID of a transmitting source is entered, and the specific code and an ID corresponding to the ID of a transmitting source are entered in the specific field in place of the ID of a transmitting source.

11. The storage system according to claim 1, wherein the controller module is provided with a plurality of controllers, each controller is provided with the processor module, the transfer control module, and the storage resource, the receiver in the (1-1) is a receiver connected to the processor module that transmits a write packet, the transmitter in the (1-2) is a transmitter connected to the storage resource of a write destination, and other receivers and transmitters carry out a transfer of the write packet.

12. The storage system according to claim 1, wherein the write packet is a response-unnecessary type packet, and the transmitter generates a response packet that is a packet corresponding to a response indicating a completion of a write providing the received packet includes the specific code in addition to the write code even in the case in which the received packet is a response-unnecessary type packet in the (1-2).

13. The storage system according to claim 12, wherein the response packet is a response-unnecessary type packet as a write.

14. A storage control method that is implemented by a storage system provided with a plurality of storage devices and at least one controller connected to the plurality of storage devices, comprising:
- transmitting a write packet including the following (15-A) to (15-D) by a controller among the at least one controller,
- (15-A) a write code that is a code representing a write;
- (15-B) a specific code that is a first specific code or a second specific code;
- (15-C) a write targeted data; and
- (15-D) a destination information indicating a storage resource of a write destination;
- writing the write targeted data in the received write packet to the storage resource indicated by the destination information in the write packet;
- if the received write packet includes the first specific code, the transmitter, generating a response packet that represents a write completion in a situation where the specific code is the first specific code and a write of the write targeted data is terminated; and
- if the received write packet includes the second specific code, reading the write targeted data from the write destination after a write operation of the write targeted data is terminated, comparing data that has been read with the write targeted data provided by the received write packet, and generating a response write packet representing a write completion in a situation where the specific code is the second specific code if the data that has been read matches the write targeted data and representing a write failure if the data that has been read does not match the write targeted data.

\* \* \* \* \*